US012665627B2

(12) United States Patent
Huang et al.

(10) Patent No.:  US 12,665,627 B2
(45) Date of Patent:      Jun. 23, 2026

(54) RADIO FREQUENCY RECEIVER, RADIO FREQUENCY RECEIVING SYSTEM, AND ELECTRONIC DEVICE

(71) Applicant: HONOR DEVICE CO., LTD., Shenzhen (CN)

(72) Inventors: Qinghua Huang, Shenzhen (CN); Zheng Li, Shenzhen (CN); Jiangtao Sun, Shenzhen (CN); Dan Chen, Shenzhen (CN); Baoxin Feng, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 7 days.

(21) Appl. No.: 18/694,282

(22) PCT Filed: Aug. 22, 2023

(86) PCT No.: PCT/CN2023/114222
§ 371 (c)(1),
(2) Date: Mar. 21, 2024

(87) PCT Pub. No.: WO2024/046172
PCT Pub. Date: Mar. 7, 2024

(65) Prior Publication Data
US 2024/0388320 A1      Nov. 21, 2024

(30) Foreign Application Priority Data
Sep. 2, 2022   (CN) .......................... 202211071627.7

(51) Int. Cl.
H04B 1/44       (2006.01)
H04B 1/00       (2006.01)
H04B 1/18       (2006.01)
H04B 7/0413     (2017.01)

(52) U.S. Cl.
CPC ............... *H04B 1/44* (2013.01); *H04B 1/006* (2013.01); *H04B 1/18* (2013.01); *H04B 7/0413* (2013.01)

(58) Field of Classification Search
CPC .......... H04B 7/0413; H04B 1/18; H04B 1/44; H04B 1/006
See application file for complete search history.

(56) References Cited

U.S. PATENT DOCUMENTS

2019/0181907 A1*   6/2019   Pfann ................. H03H 9/02007
2019/0190548 A1    6/2019   Chang et al.
(Continued)

FOREIGN PATENT DOCUMENTS

CN        112436845  A        3/2021
CN        112436847  A        3/2021
(Continued)

OTHER PUBLICATIONS

Zhou Xiaohui, "Design of the High-Performance RF Receiver for New-Generation High Throughput WLAN", China Excellent Master's Thesis Database Information Technology Edition (Monthly), Issue 11, 2017, 82 pages.
(Continued)

*Primary Examiner* — Rahel Guarino
(74) *Attorney, Agent, or Firm* — WOMBLE BOND DICKINSON (US) LLP

(57) ABSTRACT

This application provides a radio frequency receiver, a radio frequency receiving system, and an electronic device, to resolve a problem of how to optimize an insertion loss when implementing CA combinations of different quantities. A radio frequency receiving system of the electronic device includes a first radio frequency receiver. The first radio frequency receiver includes at least one first port, a first selector switch, a plurality of first filters, a plurality of (Continued)

second selector switches, a plurality of first amplifiers, two second ports, and a switch assembly. The first selector switch and the second selector switches can select to connect at least one signal transmission link in the first radio frequency receiver. And a signal transmission path is short, thereby optimizing the insertion loss.

20 Claims, 16 Drawing Sheets

(56) References Cited

U.S. PATENT DOCUMENTS

| | | |
|---|---|---|
| 2020/0412403 A1 | 12/2020 | Pehlke |
| 2022/0021357 A1 | 1/2022 | Takeuchi et al. |

FOREIGN PATENT DOCUMENTS

| | | |
|---|---|---|
| CN | 112787700 A | 5/2021 |
| CN | 213661597 U | 7/2021 |
| CN | 114124140 A | 3/2022 |
| CN | 114337693 A | 4/2022 |
| CN | 114430313 A | 5/2022 |
| WO | 2022062575 A1 | 3/2022 |
| WO | 2022116724 A1 | 6/2022 |

OTHER PUBLICATIONS

K. Badiyari and N. Nallam, "A Switched-Capacitor RF Receiver Exploiting MOS Parametric Amplification to Reduce NF," 2019 IEEE MTT-S International Microwave Symposium (IMS), Boston, MA, USA, 2019, pp. 160-163.

* cited by examiner

RADIO FREQUENCY RECEIVER, RADIO FREQUENCY RECEIVING SYSTEM, AND ELECTRONIC DEVICE

CROSS-REFERENCE TO RELATED APPLICATIONS

This application is a national stage of International Application No. PCT/CN2023/114222, filed on Aug. 22, 2023, which claims priority to Chinese Patent Application No. 202211071627.7, filed on Sep. 2, 2022. The disclosures of both of the aforementioned applications are hereby incorporated by reference in their entireties.

TECHNICAL FIELD

This application relates to the field of radio frequency technologies, and in particular, to a radio frequency receiver, a radio frequency receiving system, and an electronic device.

BACKGROUND

With rapid development of communication technologies, people have a higher requirement on a communication rate. To improve a system capacity and a peak rate, a system transmission bandwidth needs to be increased. However, each operator can obtain only a limited spectrum resource in each band. Therefore, to provide a higher service rate, a carrier aggregation (Carrier Aggregation, CA) technology is introduced in a communication system, which can effectively increase the transmission bandwidth. Because operators in different regions around the world have different spectrum allocations, carrier aggregation is implemented in different manners. so that radio frequency receiving systems of electronic devices working with different CA combinations are also different.

In the related art, a plurality of filters (Filter) and low noise amplifiers (Low Noise Amplifier, LNA) used in common CA combinations are integrated into one receive module. For example, three LNAs are integrated into one receive module, to implement CA combinations of at most three band signals. In this case, if a CA combination that includes a fourth band signal is required to be implemented, and a filter corresponding to the fourth band signal is not integrated into the receive module, a corresponding external filter needs to be arranged outside the receive module, and an LNA is "borrowed" from another receive module in a radio frequency receiving system. To be specific, the external filter is connected between the one receive module and the another receive module through wiring on a circuit board, and a signal from an antenna received by the receive module enters a processing circuit through the external filter and the LNA in the another receive module.

In addition, different receive modules are respectively configured to receive signals from different antennas, and to improve isolation for different antennas, a distance between the antennas is larger, resulting in a larger distance between the receive modules. Therefore, if the LNA in the another receive module is "borrowed" to process the signal received by the receive module, a line connected between the two receive modules is longer, resulting in a larger insertion loss.

SUMMARY

Embodiments of this application provide a radio frequency receiver, a radio frequency receiving system, and an electronic device, to resolve a problem of how to optimize an insertion loss when implementing CA combinations of different quantities.

To achieve the foregoing objective, the following technical solutions are used in embodiments of this application.

According to a first aspect, an embodiment of this application provides a radio frequency receiver. The radio frequency receiver includes at least one first port, a first selector switch, a plurality of first filters, a plurality of second selector switches, a plurality of first amplifiers, two second ports, and a switch assembly. The first selector switch includes one input end and a plurality of output ends, where the first selector switch is configured to select to connect the one input end of the first selector switch and at least one of the plurality of output ends of the first selector switch, the one input end of the first selector switch is configured to connect a first antenna, the plurality of output ends of the first selector switch include at least one first output end and at least two second output ends, and the at least one first output end is respectively connected to the at least one first port. The plurality of first filters form at least two filter groups, where each filter group includes at least one first filter; and each first filter includes an input end and an output end, and input ends of the at least two filter groups are respectively connected to the at least two second output ends. Each second selector switch includes a plurality of input ends and one output end, and the second selector switch is configured to select to connect one of the plurality of input ends of the second selector switch and the one output end of the second selector switch; and all input ends of the plurality of second selector switches form an input end group, and a plurality of input ends in the input end group are respectively connected to output ends of the plurality of first filters. Each first amplifier includes one input end and one output end, and one input end of the plurality of first amplifiers is respectively connected to one output end of the plurality of second selector switches. The switch assembly includes at least three end portions, where the at least three end portions include one first end portion and two second end portions, and the one first end portion is connected to one input end in the input end group; the two second end portions are respectively connected to the two second ports; the switch assembly is capable of switching between a first state and a second state; when the switch assembly is in the first state, the two second end portions are connected, and the first end portion is disconnected from any second end portion in the two second end portions; and when the switch assembly is in the second state, the first end portion is connected to one second end portion in the two second end portions, the first end portion is disconnected from an other second end portion in the two second end portions, and the two second end portions are disconnected.

According to the radio frequency receiver provided in this embodiment of this application, the at least one first port is connected to the at least one first output end of the first selector switch, so that signals received by the radio frequency receiver can be transmitted from the first output end and the first port to the outside of the radio frequency receiver. The input ends of the at least two filter groups are respectively connected to the at least two second output ends of the first selector switch, the plurality of input ends in the input end group formed by the input ends of the plurality of second selector switches are respectively connected to the output ends of the plurality of first filters, and one input end of the plurality of first amplifiers is respectively connected to one output end of the plurality of second selector switches. In this way, the signals received by the radio frequency receiver can be transmitted, respectively from different first amplifiers, to the outside of the radio frequency receiver and transmitted to a processing circuit of an electronic device under selection action of the plurality of second selector switches. The one first end portion of the switch assembly is connected to one input end in the input group of the plurality of second selector switches, the two second end portions of the switch assembly are respectively connected to the two second ports of the radio frequency receiver, and the switch assembly is capable of switching between the first state and the second state. When the switch assembly is in the first state, the two second ports can be connected. If one second port in the two second ports of the radio frequency receiver is connected to one first port and is connected to a second filter discretely arranged outside the radio frequency receiver on a connection path, and an other second port is connected to one second amplifier in another radio frequency receiver in the electronic device, the radio frequency receiver can receive band signals whose quantity is greater than a quantity of first amplifiers, and the band signals are respectively transmitted from the plurality of first amplifiers in the radio frequency receiver and a second amplifier in another radio frequency receiver to the processing circuit of the electronic device, to implement corresponding CA combinations. When the switch assembly is in the second state, one second port in the two second ports can be connected to an input end of one second selector switch. If the second port is connected to one first port and is connected to the second filter on the connection path, the radio frequency receiver can receive band signals whose quantity is less than or equal to the quantity of first amplifiers, and the band signals include a band signal gated by the second filter, where the band signals each can be transmitted from the plurality of first amplifiers in the radio frequency receiver to the processing circuit of the electronic device. In this way, the first amplifiers in the radio frequency receiver are fully utilized, and an unnecessary insertion loss caused by transmitting a signal in a channel of the second filter from the another radio frequency receiver to the processing circuit of the electronic device is avoided.

In some possible implementations of the first aspect, the switch assembly is further capable of switching to a third state; and when the switch assembly is in the third state, the first end portion is connected to the other second end portion in the two second end portions, the first end portion is disconnected from the one second end portion in the two second end portions, and the two second end portions are disconnected.

In this way, the switch assembly is integrated into the radio frequency receiver, and the switch assembly can switch among the first state, the second state, and the third state. In this way, when CA combinations in which a quantity of band signals is greater than the quantity of first amplifiers are required to be implemented, the radio frequency receiver can use the second amplifier in the another radio frequency receiver in the electronic device, to transmit the band signal gated by the second filter discretely arranged outside the radio frequency receiver to the processing circuit of the electronic device. In addition, when the electronic device needs to implement CA combinations in which a quantity of band signals is less than or equal to the quantity of first amplifiers, and the band signals include the band signal gated by the second filter, the band signal gated by the second filter can be transmitted from a first amplifier in the radio frequency receiver to the processing circuit of the electronic device, thereby optimizing an insertion loss of the channel of the second filter. In addition, a plurality of band signals from different antennas can be received in the electronic device using a MIMO technology. In this way, utilization of the first amplifiers is improved, and a total quantity of amplifiers in a radio frequency receiving system is also reduced, thereby saving the cost of the electronic device. Therefore, the radio frequency receiver can be used in the electronic device with a variety of usage scenarios, so that difficulties of designing and assembling the electronic device are simplified, a degree of integration of the radio frequency receiver is high, and applicability is strong.

In some possible implementations of the first aspect, the switch assembly includes a first connection structure, a second connection structure, and a third connection structure; the first connection structure includes a first connection line and a first switch; the second connection structure includes a second connection line and a second switch; the third connection structure includes a third connection line and a third switch; one end of the first connection line, one end of the second connection line, and one end of the third connection line are connected, an other end of the first connection line is connected to the one first end portion, and an other end of the second connection line and an other end of the third connection line are respectively connected to the two second end portions; and the first switch is connected in series in the first connection line, the second switch is connected in series in the second connection line, and the third switch is connected in series in the third connection line.

In this way, by controlling connection or disconnection of two switches between two end portions, the connection or disconnection between the two end portions can be controlled, so that the switch assembly can switch among the first state, the second state, and the third state.

In some possible implementations of the first aspect, the switch assembly includes a first connection structure, a second connection structure, and a third connection structure; the first connection structure includes a first connection line and a first switch, the first connection line is connected between the two second end portions, and the first switch is connected in series in the first connection line; the second connection structure includes a second connection line and a second switch, the second connection line is connected between the first end portion and the one second end portion in the two second end portions, and the second switch is connected in series in the second connection line; and the third connection structure includes a third connection line and a third switch, the third connection line is connected between the first end portion and the other second end portion in the two second end portions, and the third switch is connected in series in the third connection line.

In this way, by controlling a switch, connection or disconnection of a corresponding connection structure can be controlled, to control connection or disconnection between two end portions connected to two ends of the connection structure, so that the switch assembly can switch among the first state, the second state, and the third state, components required to be controlled are less, and a controlling difficulty is lower.

In some possible implementations of the first aspect, the at least three end portions further include one third end portion; the switch assembly further includes a fourth connection structure, a fifth connection structure, and a sixth connection structure; the fourth connection structure includes a fourth connection line and a fourth switch, the fourth connection line is connected between the third end portion and the first end portion, and the fourth switch is connected in series in the fourth connection line; the fifth connection structure includes a fifth connection line and a fifth switch, the fifth connection line is connected between the third end portion and the one second end portion in the two second end portions, and the fifth switch is connected in series in the fifth connection line; and the sixth connection structure includes a sixth connection line and a sixth switch, the sixth connection line is connected between the third end portion and the other second end portion in the two second end portions, and the sixth switch is connected in series in the sixth connection line.

In this way, the switch assembly has more end portions, and each two end portions can be connected or disconnected. In this way, the radio frequency receiver can be used in the electronic device with more usage scenarios, so that difficulties of designing and assembling of the electronic device are simplified, a degree of integration is high, and applicability is strong.

In some possible implementations of the first aspect, the at least three end portions further include one third end portion; the switch assembly further includes a fourth connection structure; the fourth connection structure includes a fourth connection line and a fourth switch; one end of the fourth connection line is connected to the one end of the first connection line, the one end of the second connection line, and the one end of the third connection line, and an other end of the fourth connection line is connected to the third end portion; and the fourth switch is connected in series in the fourth connection line.

In this way, the switch assembly has more end portions, and each two end portions can be connected or disconnected. In this way, the radio frequency receiver can be used in the electronic device with more usage scenarios, so that difficulties of designing and assembling of the electronic device are simplified, a degree of integration is high, and applicability is strong.

In some possible implementations of the first aspect, the radio frequency receiver further includes one third port; and the one third end portion is connected to the one third port. In this way, the third port of the radio frequency receiver can be connected to an output end of a third filter discretely arranged outside the radio frequency receiver, one second port can be connected to an output end of the second filter discretely arranged outside the radio frequency receiver, and an other second port can be connected to a sixth port of another radio frequency receiver in the electronic device. In this way, the radio frequency receiver can be used in an electronic device using both a MIMO technology and a CA technology, and specifically, the switch assembly can be selected to transmit band signals in CA combinations or MIMO band signals based on a communication system of an operator accessed by the electronic device, thereby enhancing applicability of the radio frequency receiver.

In some possible implementations of the first aspect, the one third end portion is connected to one input end in the input end group. In this way, when the radio frequency receiver needs to implement CA combinations including the band signal gated by the second filter discretely arranged outside the radio frequency receiver, a first amplifier configured to transmit the band signal gated by the second filter can be flexibly selected. Similarly, when the radio frequency receiving system is used in the electronic device using the MIMO technology to simultaneously receive band signals from different antennas, first amplifiers configured to transmit the MIMO band signals can be flexibly selected, thereby enhancing applicability of the radio frequency receiver.

In some possible implementations of the first aspect, the at least three end portions further include one fourth end portion; the switch assembly further includes a seventh connection structure, an eighth connection structure, a ninth connection structure, and a tenth connection structure; the seventh connection structure includes a seventh connection line and a seventh switch, the seventh connection line is connected between the fourth end portion and the first end portion, and the seventh switch is connected in series in the seventh connection line; the eighth connection structure includes an eighth connection line and an eighth switch, the eighth connection line is connected between the fourth end portion and the one second end portion in the two second end portions, and the eighth switch is connected in series in the eighth connection line; the ninth connection structure includes a ninth connection line and a ninth switch, the ninth connection line is connected between the fourth end portion and the other second end portion in the two second end portions, and the ninth switch is connected in series in the ninth connection line; and the tenth connection structure includes a tenth connection line and a tenth switch, the tenth connection line is connected between the fourth end portion and the third end portion, and the tenth switch is connected in series in the tenth connection line.

In this way, the switch assembly has more end portions, and each two end portions can be connected or disconnected. In this way, the radio frequency receiver can be used in the electronic device with more usage scenarios, so that difficulties of designing and assembling of the electronic device are simplified, a degree of integration is high, and applicability is strong.

In some possible implementations of the first aspect, the at least three end portions further include one fourth end portion; the switch assembly further includes a fifth connection structure; the fifth connection structure includes a fifth connection line and a fifth switch; one end of the fifth connection line is connected to the one end of the first connection line, the one end of the second connection line, the one end of the third connection line, and the one end of the fourth connection line, and an other end of the fifth connection line is connected to the fourth end portion; and the fifth switch is connected in series in the fifth connection line.

In this way, the switch assembly has more end portions, and each two end portions can be connected or disconnected. In this way, the radio frequency receiver can be used in the electronic device with more usage scenarios, so that difficulties of designing and assembling of the electronic device are simplified, a degree of integration is high, and applicability is strong.

In some possible implementations of the first aspect, the one fourth end portion is connected to one input end in the input end group. In this way, in a case that the radio frequency receiver includes the third port and the third end portion is connected to the third port, the third port of the radio frequency receiver can be connected to one MIMO signal link, one second port can be connected to an output end of the second filter discretely arranged outside the radio frequency receiver, and an other second port can be connected to a sixth port of the another radio frequency receiver. In this way, the radio frequency receiver can be used in an electronic device using both a MIMO technology and a CA technology, and first amplifiers configured to transmit the band signal gated by the second filter and the MIMO band signals can be flexibly selected, thereby enhancing applicability of the radio frequency receiver.

In some possible implementations of the first aspect, the radio frequency receiver further includes one fourth port; and the one fourth end portion is connected to the one fourth port. In this way, in a case that the radio frequency receiver includes the third port and the third end portion is connected to the third port, the third port of the radio frequency receiver can be connected to one MIMO signal link, the fourth port can be connected to another MIMO signal link, one second port can be connected to an output end of the second filter discretely arranged outside the radio frequency receiver, and an other second port can be connected to a sixth port of the another radio frequency receiver. In this way, the radio frequency receiver can be used in an electronic device using both a MIMO technology and a CA technology, and specifically, the switch assembly can be selected to transmit band signals in CA combinations or MIMO band signals based on a communication system of an operator accessed by the electronic device, thereby enhancing applicability of the radio frequency receiver.

In some possible implementations of the first aspect, the radio frequency receiver further includes a plurality of fifth ports and one third selector switch. The one third selector switch includes a plurality of input ends and a plurality of output ends, where the plurality of input ends of the one third selector switch are respectively connected to output ends of the plurality of first amplifiers; the plurality of output ends of the one third selector switch are respectively connected to the plurality of fifth ports; and the third selector switch is configured to select the plurality of input ends of the one third selector switch to be respectively connected to the plurality of output ends of the one third selector switch.

In this way, through the third selector switch, band signals output by the plurality of first amplifiers can be transmitted to a corresponding port of a radio frequency transceiver chip in the processing circuit, to ensure a processing effect of the electronic device on the received signals, thereby ensuring performance of the electronic device.

According to a second aspect, an embodiment of this application further provides a radio frequency receiving system. The radio frequency receiving system includes a first antenna and a first radio frequency receiver. The first radio frequency receiver is the radio frequency receiver according to any one of the foregoing technical solutions, and the one input end of the first selector switch in the first radio frequency receiver is connected to the first antenna.

Beneficial technical effects of the radio frequency receiving system provided in this embodiment of this application are the same as beneficial technical effects of the radio frequency receiver provided in this embodiment of this application, and details are not described herein again.

In some possible implementations of the second aspect, the radio frequency receiving system further includes a second filter and a second radio frequency receiver. The second filter includes an input end and an output end, where the input end of the second filter is connected to one first port in the at least one first port in the first radio frequency receiver, and the output end of the second filter is connected to one second port in the two second ports in the first radio frequency receiver. The second radio frequency receiver includes a sixth port and a second amplifier, where the second amplifier includes an input end, the input end of the second amplifier is connected to the sixth port, and the sixth port is connected to the other second port in the two second ports in the first radio frequency receiver.

In this way, the first radio frequency receiver can receive band signals whose quantity is greater than a quantity of first amplifiers, and the band signals are respectively transmitted from the plurality of first amplifiers in the first radio frequency receiver and the second amplifier in the second radio frequency receiver to a processing circuit of an electronic device, to implement corresponding CA combinations.

According to a third aspect, an embodiment of this application further provides an electronic device. The electronic device includes the radio frequency receiving system according to any one of the foregoing technical solutions.

Beneficial technical effects of the electronic device provided in this embodiment of this application are the same as beneficial technical effects of the radio frequency receiving system provided in this embodiment of this application, and details are not described herein again.

REFERENCE NUMERALS

Figure 1:
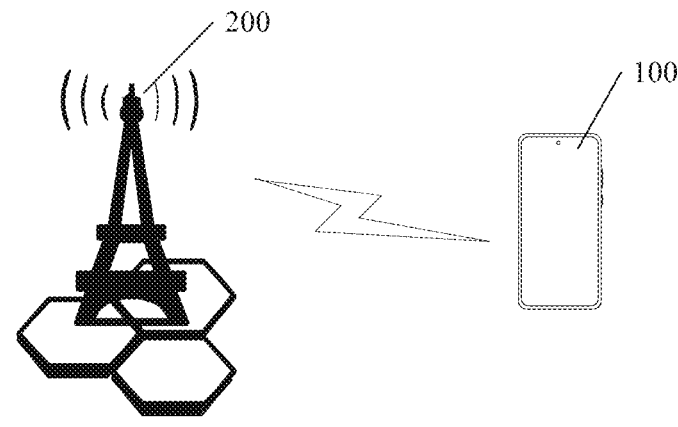
FIG. 1 is a schematic diagram of communication between a terminal device and a base station according to some embodiments of this application.

100—terminal device;
10—radio frequency receiving system;
11—first antenna;
12—first radio frequency receiver; 121—first selector switch; 1211—first output end; 1212—second output end; 122—first filter; 123—second selector switch; 124—first amplifier; 125—first port; 126—second port; 127—switch assembly; 1271—end portion; 1271a—first end portion; 1271b—second end portion; 1271c—third end portion; 1271d—fourth end portion; 1272—single-pole multi-throw switch; 1273—first connection structure; 1273a—first connection line; 1273b—first switch; 1274—second connection structure; 1274a—second connection line; 1274b—second switch; 1275—third connection structure; 1275a—third connection line; 1275b—third switch; 1276—fourth connection structure; 1277—fifth connection structure; 1278—sixth connection structure; 1279—seventh connection structure; 1280—eighth connection structure; 1281—ninth connection structure; 1282—tenth connection structure; 128—third port; 129—fourth port; 130—fifth port; and 131—third selector switch;
13—second filter;
14—second radio frequency receiver; 141—sixth port; and 142—second amplifier;
15—second single-pole double-throw switch;
16—third filter;
17—third single-pole double-throw switch;
18—second antenna;
19—impedance matching network; and
200—base station.

DESCRIPTION OF EMBODIMENTS

In embodiments of this application, it should be noted that, unless otherwise explicitly specified or defined, terms such as "install" and "connection" should be understood in a broad sense. For example, the "connection" may be a detachable connection or a non-detachable connection; or the "connection" may be a direct connection, or an indirect connection through an intermediary. It should be noted that, "connection" between electronic components in embodiments of this application refers to coupling, which includes direct connection or indirect connection through other components to achieve electrical communication.

In embodiments of this application, it should be understood that, mentioned directional terms, such as "up", "down", "left", "right", "inside", and "outside", refer to the directions in the accompanying drawings. Therefore, the used orientation terms are for the purpose of better and clearer description and understanding of embodiments of this application, but do not indicate or imply that an apparatus or component referred to necessarily have a particular orientation, and be constructed in a particular orientation and operation. Therefore, it cannot be construed as a limitation on embodiments of this application.

In embodiments of this application, terms "first", "second", "third", "fourth", "fifth", "sixth", "seventh", "eighth", "ninth", and "tenth" are used merely for the purpose of description, and shall not be construed as indicating or implying relative importance or implying a quantity of indicated technical features. Therefore, features defining "first", "second", "third", "fourth", "fifth", "sixth", "seventh", "eighth", "ninth", and "tenth" may explicitly or implicitly include one or more such features.

The term "include", "comprise", or any other variation thereof in embodiments of this application is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one . . . " does not exclude that there are still other same elements in the processes, methods, objects, or apparatuses.

The term "and/or" in embodiments of this application describes only an association relationship for describing associated objects and represents that three relationships may exist. For example. A and/or B may represent the following three cases: Only A exists, both A and B exist, and only B exists. In addition, the character "/" in this specification generally indicates an "or" relationship between the associated objects.

This application provides an electronic device. The electronic device may be a terminal device or a radio access network device having a function of transmitting and receiving a radio frequency signal.

Specifically, the terminal device may also be an access terminal, a user device, a subscriber unit, a subscriber station, a mobile station, a mobile, a remote station, a remote terminal, a mobile device, a user terminal, a terminal, a wireless communication device, a user agent, or a user apparatus. The terminal device may also be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, an in-vehicle device, a wearable device, a terminal device in a 5G network, or a terminal device in a future evolved public land mobile network (Public Land Mobile Network, PLMN). This is not limited in this application.

The radio access network device includes but is not limited to a base station. The base station may be a base transceiver station (Base Transceiver Station, BTS) in a GSM or CDMA system, or may be a NodeB (NodeB, NB) in a WCDMA system, or may be an evolved NodeB (Evolutional NodeB, eNB or eNodeB) in an LTE system, or may be a wireless controller in a cloud radio access network (Cloud Radio Access Network, CRAN) scenario, or the base station may be a relay station, an access point, an in-vehicle device, a wearable device, a base station in a 5G network, or the like. This is not limited in this application.

The communication system used in the electronic device may include but is not limited to: a global system of mobile communication (Global System of Mobile communication, GSM) system, a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an LTE frequency division duplex (Frequency Division Duplex, FDD) system, an LTE time division duplex (Time Division Duplex, TDD), a universal mobile telecommunication system (Universal Mobile Telecommunication System, UMTS), a worldwide interoperability for microwave access (Worldwide Interoperability for Microwave Access, WiMAX) communication system, a 5th generation (5th Generation, 5G) system, or new radio (New Radio, NR).

In the following embodiments, an example in which the electronic device is a terminal device and the terminal device is a mobile phone is used for illustrative description.

Refer to FIG. 1. FIG. 1 is a schematic diagram of communication between a terminal device 100 and a base station 200 according to some embodiments of this application. The terminal device 100 includes a radio frequency receiving system and a processing circuit.

The radio frequency receiving system of the terminal device 100 is configured to receive, process, and transmit a receiving signal from the base station 200 to the processing circuit on a back end. The processing circuit is configured to generate a sending signal or process the receiving signal. The processing circuit may include a processor and a radio frequency transceiver chip. The processor may include one or more processing units. For example, the processor may include a baseband processor, an application processor (application processor. AP), a modem processor, a graphics processing unit (graphics processing unit, GPU), an image signal processor (image signal processor, ISP), a controller, a memory, a video codec, a digital signal processor (digital signal processor, DSP), a neural-network processing unit (neural-network processing unit, NPU), and/or the like. Different processing units may be independent components, or may be integrated into one or more processors.

When the radio frequency receiving system receives the receiving signal, a receiving link of a corresponding band is switched to through a component such as a selector switch in the radio frequency receiving system, and after being input, via the receiving link, to the radio frequency transceiver chip for processing such as filtering, amplification, and frequency mixing, the receiving signal is input to the baseband processor for demodulation. In addition, the radio frequency transceiver chip further outputs a control signal for an assembly such as a selector switch in a radio frequency receiving system 10 through control lines, to control the selector switch to switch to different links.

With rapid development of communication technologies, people have a higher requirement on a communication rate. To improve a system capacity and a peak rate, a system transmission bandwidth needs to be increased. For example, according to a long term evolution advanced (Long Term Evolution Advanced, LTE-A) standard, a maximum bandwidth of a system is 100 MHz. However, each operator can obtain only a limited spectrum resource in each band, which cannot meet a bandwidth requirement. To provide a higher service rate, a carrier aggregation (Carrier Aggregation, CA) technology is introduced in a communication system, to be specific, component carriers (Component Carrier, CC) of different bands are aggregated to implement a required communication bandwidth. Specifically, a signal received by an antenna of the terminal device 100 is a signal formed by aggregation of carriers of different bands. For example, the signal is a signal obtained through aggregation of carriers of two, three, or four band signals in B1, B3, B34, B39, B40, and B7 signals, thereby increasing the bandwidth and improving a downlink transmission rate. Because operators in different regions around the world have different spectrum allocations, there are different band combination manners of carrier aggregations. Therefore, to adapt to reception of carrier aggregation signals from different base stations 200, the radio frequency receiving system 10 of the terminal device 100 needs to be able to segment and process different band signals. It should be noted that, Bx herein each indicates a band corresponding to an LTE band number x. It may be understood that, a meaning of Bx in the following descriptions is the same as that herein, and details are not explained later.

Figure 2:
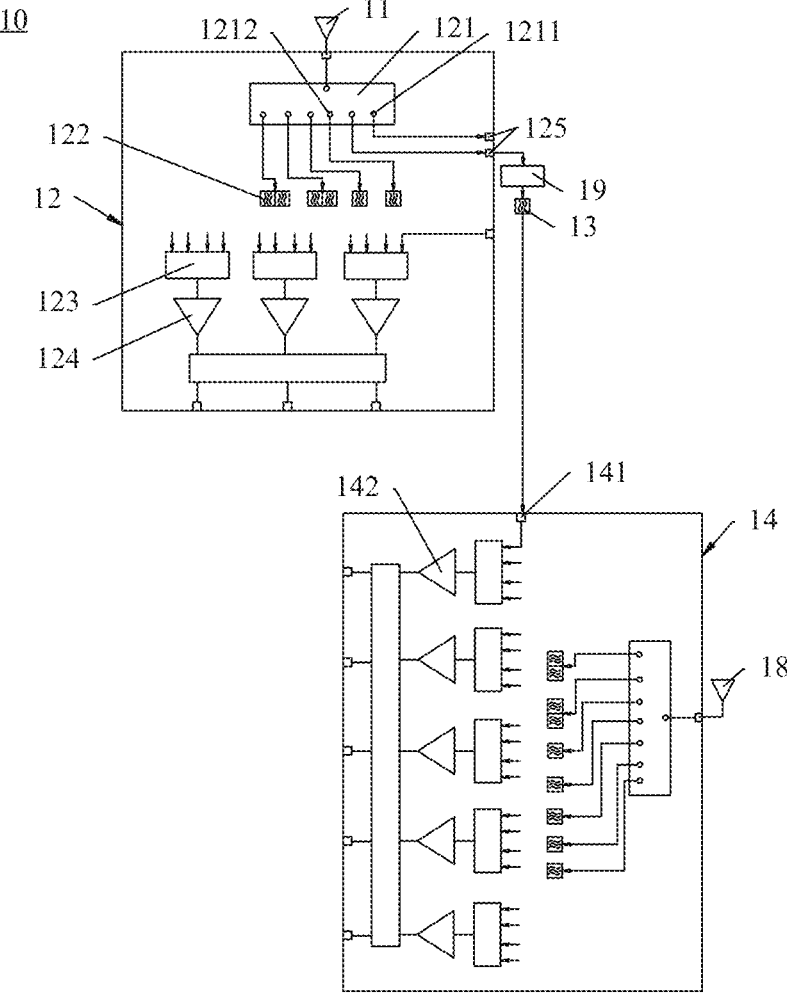
FIG. 2 is a schematic diagram of a radio frequency receiving system of a terminal device according to some embodiments of this application.

Based on this, refer to FIG. 2. FIG. 2 is a schematic diagram of a radio frequency receiving system 10 of a terminal device 100 according to some embodiments of this application. The radio frequency receiving system 10 includes a first antenna 11 and a first radio frequency receiver 12. The first radio frequency receiver 12 includes a first selector switch 121, a plurality of first filters 122, a plurality of second selector switches 123, and a plurality of first amplifiers 124.

The first selector switch 121 includes one input end and a plurality of output ends. The one input end of the first selector switch 121 is connected to the first antenna 11. The one input end of the first selector switch 121 may be detachably connected to the first antenna 11 through a connection port of the first radio frequency receiver 12, or the input end of the first selector switch 121 may be connected to the first antenna 11 through an integrated structure such as a feed line. This is not limited in this application.

The first selector switch 121 is configured to select to connect the one input end of the first selector switch 121 and at least one of the plurality of output ends of the first selector switch 121. In some examples, the one input end of the first selector switch 121 may be connected to one output end in the plurality of output ends, so that a receiving signal from the first antenna 11 is output from the one output end of the first selector switch 121. In some other examples, the one input end of the first selector switch 121 may alternatively be simultaneously connected to two or more output ends of the first selector switch 121, so that a receiving signal from the first antenna 11 is simultaneously output from the two or more output ends of the first selector switch 121 to different signal transmission links, which can be specifically determined based on a matching relationship between the first radio frequency receiver 12 and a band signal transmitted by the operator base station 200.

The plurality of output ends of the first selector switch 121 include at least two second output ends 1212. Based on this, the plurality of first filters 122 form at least two filter groups, where each filter group includes at least one first filter 122; and each first filter 122 includes an input end and an output end, and input ends of the at least two filter groups are respectively connected to the at least two second output ends 1212. It may be understood that, the input ends of the filter groups may be connected to the second output ends 1212 in a one-to-one correspondence. In the embodiment shown in FIG. 2, a quantity of filter groups is four. In other examples, there may alternatively be two or another quantity of filter groups. This is not limited in this application. It should be noted that, for brevity of the accompanying drawings, only one first filter 122 is numbered in FIG. 2. It should be understood that, when a quantity of components appearing below is multiple, for the components, refer to a numbering manner of the first filter 122. Details are not described below again.

There are a plurality of combination forms for the at least two filter groups formed by the plurality of first filters 122.

In some examples, each filter group may include two first filters 122. The two first filters 122 are an integrated structural member and share one input end, in other words, the one input end shared by the two first filters 122 is an input end of the filter group. The two first filters 122 each have one output end. The two first filters 122 forming an integrated structure may be configured to gate two band signals with similar frequencies. For example, two first filters 122 configured to gate a B1 signal and gate a B3 signal may be an integrated structural member, and two first filters 122 configured to gate a B34 signal and gate a B39 signal may be an integrated structural member. In this way, structures of the two first filters 122 of the integrated structure are similar, which is convenient for design and processing, and can reduce a quantity of lines between the plurality of first filters 122 and the first selector switch 121, thereby simplifying design and wiring difficulties of the first radio frequency receiver 12.

In some other examples, each filter group may include one first filter 122, and an input end of the one first filter 122 is connected to one second output end 1212 of the first selector switch 121.

In still other examples, in the at least two filter groups, one part of the filter groups may include one first filter 122, and another part of the filter groups may include two first filters 122. In the embodiment shown in FIG. 2, in the four filter groups, two filter groups each include two first filters 122, and other two filter groups each include one first filter 122.

It should be noted that, all the first filters in the first radio frequency receiver 12 can gate different frequencies, so that a frequency of a signal output from the output end of each first filter 122 is different from a frequency of a signal output from any other first filter 122. In this way, the first radio frequency receiver 12 can receive as many different band signals as possible, to implement as many CA combinations as possible.

Based on this, each second selector switch 123 includes a plurality of input ends and one output end, and the second selector switch 123 is configured to select to connect one of the plurality of input ends of the second selector switch 123 and the one output end of the second selector switch 123. In the embodiment shown in FIG. 2, a quantity of input ends of each second selector switch 123 may be four, in other words, the second selector switch 123 may be a single-pole four-throw switch. Certainly, the quantity of input ends of each second selector switch 123 may alternatively be two, three, five, or the like. This is not limited in this application.

Based on this, all input ends of the plurality of second selector switches 123 form an input end group, and a plurality of input ends in the input end group are respectively connected to output ends of the plurality of first filters 122. In the embodiment shown in FIG. 2, an input end group formed by all input ends of three second selector switches 123 includes 12 input ends in total. In the input end group formed by all the input ends of the plurality of second selector switches 123, a part of input ends may be respectively connected to the output ends of the plurality of first filters 122, in other words, the part of input ends may be idle without wiring; or all input ends may be respectively connected to the output ends of the plurality of first filters 122. An output end of one first filter 122 may be connected to an output end of one second selector switch 123, or may be simultaneously connected to one output end of the plurality of second selector switches 123, which only needs to ensure that output ends of two first filters 122 in one filter group have a connection manner of being respectively connected to input ends of two second selector switches 123, to implement CA combinations of band signals gated by the two first filters 122 in the one filter group.

Based on this, each first amplifier 124 includes one input end and one output end, and one input end of the plurality of first amplifiers 124 is respectively connected to one output end of the plurality of second selector switches 123. In other words, the first amplifiers 124 are in a one-to-one correspondence with the second selector switches 123, and an input end of one first amplifier 124 is connected to an output end of one second selector switch 123. It should be noted that, a quantity of first filters 122 may be greater than or equal to a quantity of first amplifiers 124. In this way, in a case that the quantity of first amplifiers 124 is fixed, the radio frequency receiving system 10 can receive as many different band signals as possible, so that the terminal device 100 can adapt to communication spectra of different regions and different operators as much as possible, thereby increasing market competitiveness of the terminal device 100.

In some examples, the first amplifier 124 may be a low noise amplifier LNA. The LNA is an amplifier with a very small noise figure, which can amplify a weak radio frequency signal received by the first antenna 11 and reduce introduction of noise as much as possible, thereby effectively improving receiving sensitivity of the first radio frequency receiver 12. In some other examples, the first amplifier 124 may alternatively be another tolerant amplifier, as long as the amplifier can amplify a radio frequency signal received by the first antenna 11 and reduce introduction of noise as much as possible.

According to the foregoing descriptions, when the quantity of first filters 122 is greater than the quantity of first amplifiers 124. the first radio frequency receiver 12 can simultaneously receive and output at most band signals with a same quantity as the first amplifiers 124. Therefore, in CA combinations that can be implemented with signals received by the first radio frequency receiver 12, a quantity of band signals can be at most the same as the quantity of first amplifiers 124. In the embodiment shown in FIG. 2, a quantity of LNAs is three. Therefore, in the CA combinations that can be implemented with the signals received by the first radio frequency receiver 12, the quantity of band signals can be at most three. To enable the first radio frequency receiver 12 to be used in communication systems of as many operators in as many regions as possible and realize possibility of a plurality of CA combinations, the first radio frequency receiver 12 may integrate a plurality of first filters 122 used in common CA combinations. For example, in the embodiment shown in FIG. 2, the first radio frequency receiver 12 may integrate first filters 122 that gate B1, B3, B34, B39, B40, and B7 signals, and integrate three LNAs to implement a plurality of CA combinations of less than or equal to three band signals. Therefore, CA combination of four band signals cannot be implemented. In addition, from the perspective of area and cost, the first filters 122 integrated into the first radio frequency receiver 12 usually do not cover all spectra of all operators around the world. Therefore, the terminal device 100 cannot achieve such a goal: A single first radio frequency receiver 12 receives and gates CA combinations of band signals (such as B1, B3, B34, B39, B40, B7) corresponding to first filters 122 integrated through transmission and a band signal (such as B32) corresponding to a filter not integrated into the first radio frequency receiver 12.

Based on this, still refer to FIG. 2. The first radio frequency receiver 12 further includes at least one first port 125, the output ends of the first selector switch 121 further include at least one first output end 1211, and the at least one first output end 1211 is respectively connected to the at least one first port 125. A quantity of first ports 125 and a quantity of first output ends 1211 each may be one, or a quantity of first ports 125 and a quantity of first output ends 1211 each may be multiple; and the first ports 125 are connected to the first output ends 1211 in a one-to-one correspondence.

Based on this, the radio frequency receiving system 10 further includes a second filter 13, an impedance matching network 19, a second radio frequency receiver 14, and a second antenna 18. The second radio frequency receiver 14 is connected to the second antenna 18 to receive a signal from the second antenna 18. The second radio frequency receiver 14 includes a sixth port 141 and a second amplifier 142. The second amplifier 142 includes an input end, and the input end of the second amplifier 142 is connected to the sixth port 141. Specifically, the input end of the second amplifier 142 may be indirectly connected to the sixth port 141 through a selector switch. In some examples, the second amplifier 142 may be a low noise amplifier (Low Noise Amplifier, LNA). The LNA is an amplifier with a very small noise figure, which can amplify a weak radio frequency signal and reduce introduction of noise as much as possible, thereby effectively improving receiving sensitivity of the radio frequency receiving system 10. In some other examples, the second amplifier 142 may alternatively be another tolerant amplifier, as long as the amplifier can amplify a radio frequency signal and reduce introduction of noise as much as possible.

A structure of the second radio frequency receiver 14 may be the same as a structure of the first radio frequency receiver 12, or may be different from the structure of the first radio frequency receiver 12. In the embodiment shown in FIG. 2, the structure of the second radio frequency receiver 14 is approximately the same as the structure of the first radio frequency receiver 12. A difference is that, the second radio frequency receiver 14 may integrate filters that can gate more band signals so that the radio frequency receiving system 10 can implement a diversity receiving function of more band signals, to improve the receiving sensitivity of the radio frequency receiving system 10.

The second filter 13 includes an input end and an output end, where the input end of the second filter 13 is connected to one first port 125 in the at least one first port 125 in the first radio frequency receiver 12, and the impedance matching network 19 is connected in series in a connection line. The second filter 13, the first radio frequency receiver 12, and the second radio frequency receiver 14 are discretely arranged on a circuit board of the terminal device 100, and a center frequency of the second filter 13 may be determined based on regions in which the terminal device 100 is used. For example, the second filter 13 may be configured to gate a band signal whose application regions are less.

One manner in which the radio frequency receiving system 10 can receive the band signal gated by the second filter 13 to implement corresponding CA combinations is as follows: The output end of the second filter 13 is connected to the sixth port 141 of the second radio frequency receiver 14, in other words, the output end of the second filter 13 is connected to the second radio frequency receiver 14 through wiring on the circuit board of the terminal device 100, and the band signal output from the second filter 13 can be transmitted from the second amplifier 142 in the second radio frequency receiver 14 to the processing circuit for processing. When the terminal device 100 has a plurality of antennas, necessary spatial isolation is required between the antennas. Therefore, a distance between the second radio frequency receiver 14 and the first radio frequency receiver 12 is long, resulting in a long line between the second filter 13 and the second radio frequency receiver 14, and further resulting in a large insertion loss. For example, surface wiring of a 50 mm length causes an insertion loss of about 1.5 db. In addition, in addition to the CA combinations of the foregoing four band signals, there may also be a usage scenario of CA combinations of the band signal gated by the second filter 13 and band signals whose quantity is less than the quantity of first amplifiers 124 in the first radio frequency receiver 12. In this case, at least one first amplifier 124 is idle in the first radio frequency receiver 12. If a band signal of a channel of the second filter 13 still enters the processing circuit from the second amplifier 142 in the second radio frequency receiver 14, an unnecessary insertion loss in the channel of the second filter 13 is caused.

Figure 3:
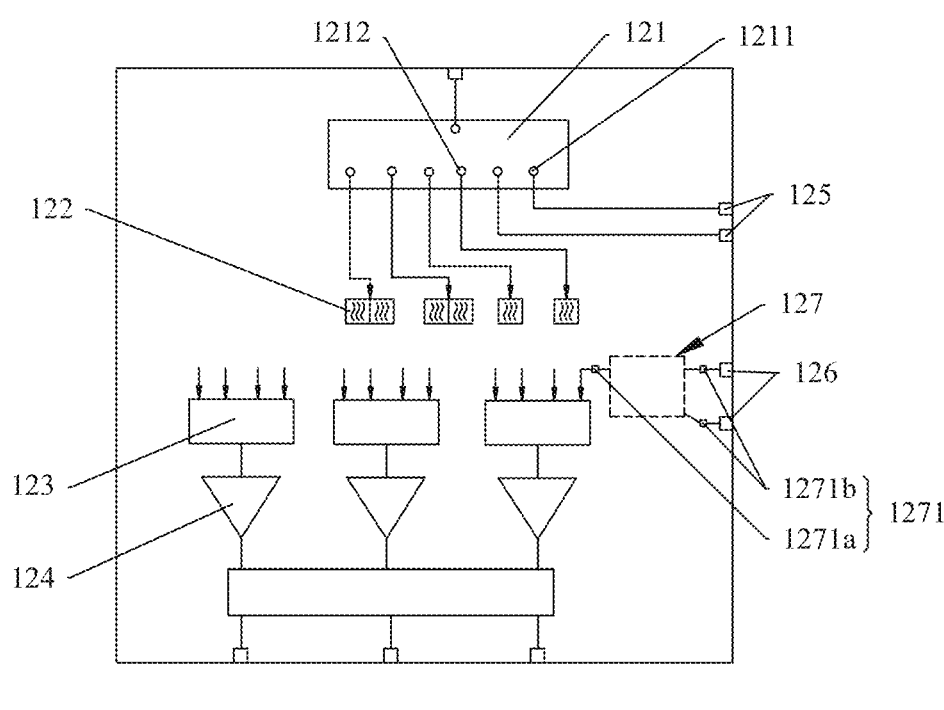
FIG. 3 is a schematic diagram of a first radio frequency receiver according to some embodiments of this application.
Figure 4:
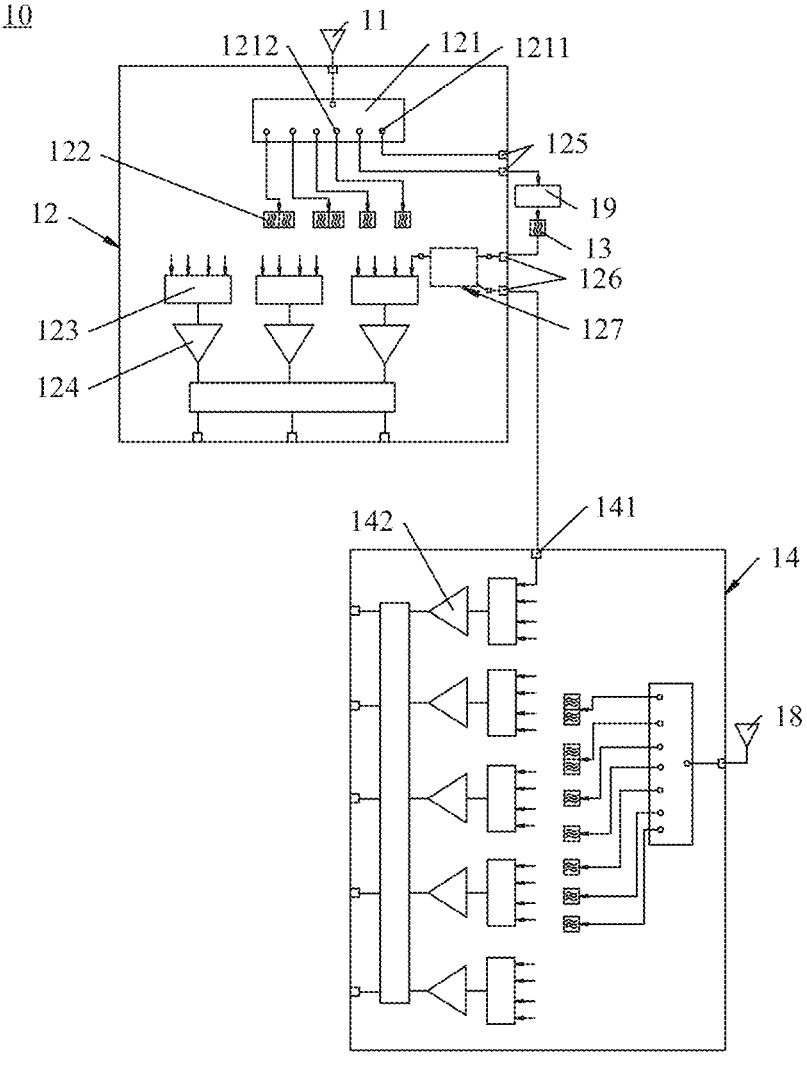
FIG. 4 is a schematic diagram of a radio frequency receiving system of a terminal device according to some other embodiments of this application.

To resolve the foregoing problems, refer to FIG. 3 and FIG. 4. FIG. 3 is a schematic diagram of a first radio frequency receiver 12 according to some embodiments of this application. FIG. 4 is a schematic diagram of a radio frequency receiving system 10 of a terminal device 100 according to some other embodiments of this application. The first radio frequency receiver 12 further includes two second ports 126 and a switch assembly 127. The output end of the second filter 13 is connected to one second port 126 in the two second ports 126, and the sixth port 141 of the second radio frequency receiver 14 is connected to an other second port 126 in the two second ports 126 of the first radio frequency receiver 12.

The switch assembly 127 includes at least three end portions 1271, where the at least three end portions 1271 include one first end portion 1271a and two second end portions 1271b. the one first end portion 1271a is connected to one input end in the input end group of the plurality of second selector switches 123, and the two second end portions 1271b are respectively connected to the two second ports 125. The switch assembly 127 is capable of switching between a first state and a second state.

When the switch assembly 127 is in the first state, the two second end portions 1271b are connected, and the first end portion 1271a is disconnected from any second end portion 1271b in the two second end portions 1271b. In this way, a signal link formed by the first selector switch 121, the second filter 13, the two second ports 126, the two second end portions 1271b, the sixth port 141, and the second amplifier 142 is connected. For example, four band signals received by the first radio frequency receiver 12 from the first antenna 11 are B1, B3, B7, and B32 signals respectively, the B1 signal, the B3 signal, and the B7 signal are output from three signal links in the first radio frequency receiver 12 to the processing circuit of the terminal device 100, and the B32 signal is output, to the processing circuit of the terminal device 100, from the signal link formed by the first selector switch 121, the second filter 13, the two second ports 126, the two second end portions 1271b, the sixth port 141, and the second amplifier 142, to implement CA combinations of the four band signals.

When the switch assembly 127 is in the second state, the first end portion 1271a is connected to one second end portion 1271b in the two second end portions 1271b, and the one second end portion 1271b is connected to the output end of the second filter 13 through the second port 126; and the first end portion 1271a is disconnected from an other second end portion 1271b in the two second end portions 1271b, and the two second end portions 1271b are disconnected.

In this way, a signal link formed by the first selector switch 121, the second filter 13, one second port 126, one second end portion 1271b, one second selector switch 123, and one first amplifier 124 is connected; and the signal link formed by the first selector switch 121, the second filter 13, the two second ports 125, the two second end portions 1271b, the sixth port 141, and the second amplifier 142 is disconnected. The first radio frequency receiver 12 receives band signals whose quantity is less than or equal to three from the first antenna 11. For example, the three band signals may be the B1, B3, and B32 signals respectively, or the three band signals may be the B1 B7, and B32 signals respectively. Alternatively, two band signals received by the first radio frequency receiver 12 from the first antenna 11 may be the B1 and B32 signals respectively, or the two band signals may be the B3 and B32 signals respectively, or the two band signals may be the B7 and B32 signals respectively. The B32 signal may be transmitted to the processing circuit of the terminal device 100 via the signal link formed by the first selector switch 121, the second filter 13, the one second port 126, the one second end portion 1271b, the one second selector switch 123, and the one first amplifier 124; and another one or two band signals may be transmitted from signal transmission links in the first radio frequency receiver 12 to the processing circuit of the terminal device 100, to implement two or three CA combinations including the B32 signal. The B32 signal is transmitted from the inside of the first radio frequency receiver 12 to the processing circuit of the terminal device 100. Therefore, a transmission path thereof is shorter than a transmission path from the second amplifier 142 in the second radio frequency receiver 14 to the processing circuit, and an insertion loss is smaller, so that NF performance of the terminal device 100 is effectively optimized, receiving sensitivity is improved, and user experience is enhanced.

In conclusion, according to the first radio frequency receiver 12 provided in some embodiments of this application, the at least one first port 125 is connected to the at least one first output end 1211 of the first selector switch 121, so that signals received by the first radio frequency receiver 12 from the first antenna 11 can be transmitted from the first output end 1211 and the first port 125 to the outside of the first radio frequency receiver 12. The input ends of the at least two filter groups are respectively connected to the at least two second output ends 1212 of the first selector switch 121, the plurality of input ends in the input end group formed by the input ends of the plurality of second selector switches 123 are respectively connected to the output ends of the plurality of first filters 122, and one input end of the plurality of first amplifiers 124 is respectively connected to one output end of the plurality of second selector switches 123. In this way, the signals received by the first radio frequency receiver 12 from the first antenna 11 can be transmitted, respectively from different first amplifiers 124, to the outside of the first radio frequency receiver 12 and transmitted to the processing circuit of the terminal device 100 under selection action of the plurality of second selector switches 123. The one first end portion 1271a of the switch assembly 127 is connected to one input end in the input group of the plurality of second selector switches 123, the two second end portions 1271b of the switch assembly 127 are respectively connected to the two second ports 126 of the first radio frequency receiver 12, and the switch assembly 127 is capable of switching between the first state and the second state. When the switch assembly 127 is in the first state, the two second ports 126 can be connected. If one second port 126 in the two second ports 126 of the first radio frequency receiver 12 is connected to one first port 125 and is connected to the second filter 13 on a connection path, and an other second port 126 is connected to one second amplifier 142 in the second radio frequency receiver 14, the first radio frequency receiver 12 can receive band signals whose quantity is greater than the quantity of first amplifiers 124, and the band signals are respectively transmitted from the plurality of first amplifiers 124 in the first radio frequency receiver 12 and the second amplifier 142 in the second radio frequency receiver 14 to the processing circuit of the terminal device 100, to implement corresponding CA combinations. When the switch assembly 127 is in the second state, one second port 126 in the two second ports 126 can be connected to an input end of one second selector switch 123. If the second port 126 is connected to one first port 125 and is connected to the second filter 13 on the connection path, the first radio frequency receiver 12 can receive band signals whose quantity is less than or equal to the quantity of first amplifiers 124, and the band signals include a band signal gated by the second filter 13, where the band signals each can be transmitted from the plurality of first amplifiers 124 in the first radio frequency receiver 12 to the processing circuit of the terminal device 100. In this way, the first amplifiers 124 in the first radio frequency receiver 12 are fully utilized, and an unnecessary insertion loss caused by transmitting a signal in a channel of the second filter 13 from the second radio frequency receiver 14 to the processing circuit of the terminal device 100 is avoided.

The switch assembly 127 has a plurality of structures to be capable of switching between the first state and the second state.

Figure 5:
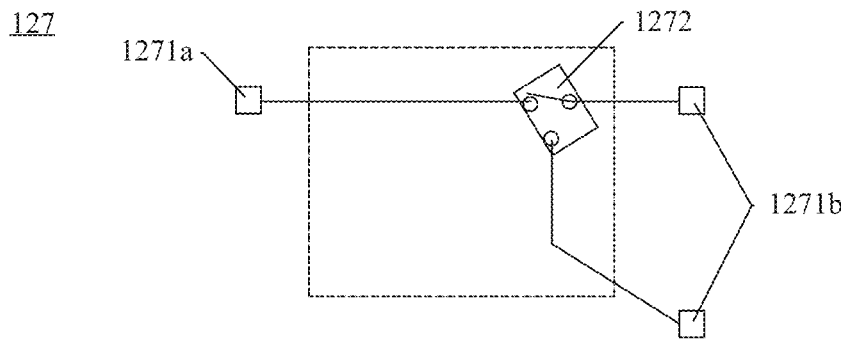
FIG. 5 is a schematic diagram of a structure of a switch assembly in the first radio frequency receiver shown in FIG. 3.
Figure 6:
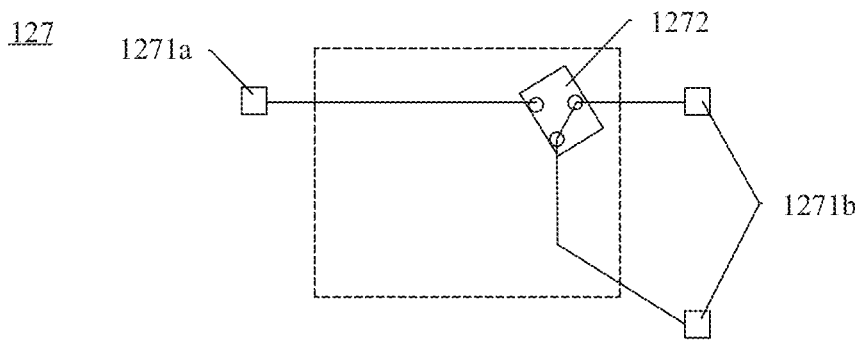
FIG. 6 is a schematic diagram when the switch assembly shown in FIG. 5 is in a first state.
Figure 7:
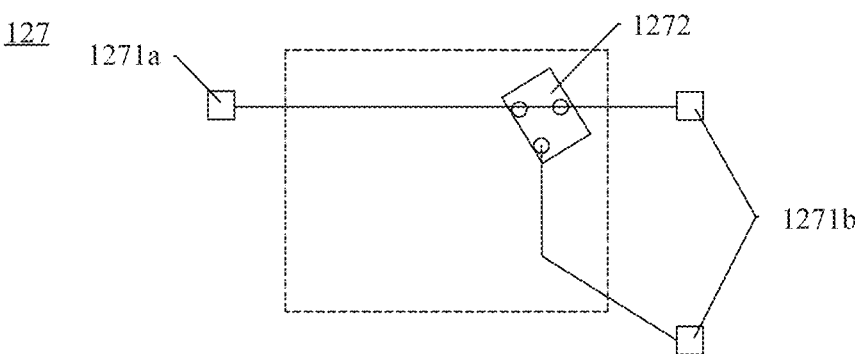
FIG. 7 is a schematic diagram when the switch assembly shown in FIG. 5 is in a second state.

In some examples, refer to FIG. 5. FIG. 5 is a schematic diagram of a structure of the switch assembly 127 in the first radio frequency receiver 12 shown in FIG. 3. The switch assembly 127 further includes a single-pole multi-throw switch 1272. A movable end of the single-pole multi-throw switch 1272 is connected to one second end portion 1271b in the two second end portions 1271b. One non-movable end of the single-pole multi-throw switch 1272 is connected to the first end portion 1271a, and an other non-movable end is connected to an other second end portion 1271b in the two second end portions 1271b. Refer to FIG. 6. FIG. 6 is a schematic diagram when the switch assembly 127 shown in FIG. 5 is in a first state. When the switch assembly 127 is in the first state, the movable end of the single-pole multi-throw switch 1272 is connected to the non-movable end connected to the other second end portion 1271*b*, so that the two second end portions 1271*b* of the switch assembly 127 are connected, and the first end portion 1271*b* is disconnected from any second end portion 1271*b*. Refer to FIG. 7. FIG. 7 is a schematic diagram when the switch assembly 127 shown in FIG. 5 is in a second state. When the switch assembly 127 is in the second state, the movable end of the single-pole multi-throw switch 1272 is connected to the non-movable end connected to the first end portion 1271*a*, so that the first end portion 1271*a* of the switch assembly 127 is connected to one second end portion 1271*b* and is disconnected from an other second end portion 1271*b*, and the two second end portions 1271*b* are disconnected. Specifically, the single-pole multi-throw switch 1272 may be a single-pole double-throw switch.

Figure 8:
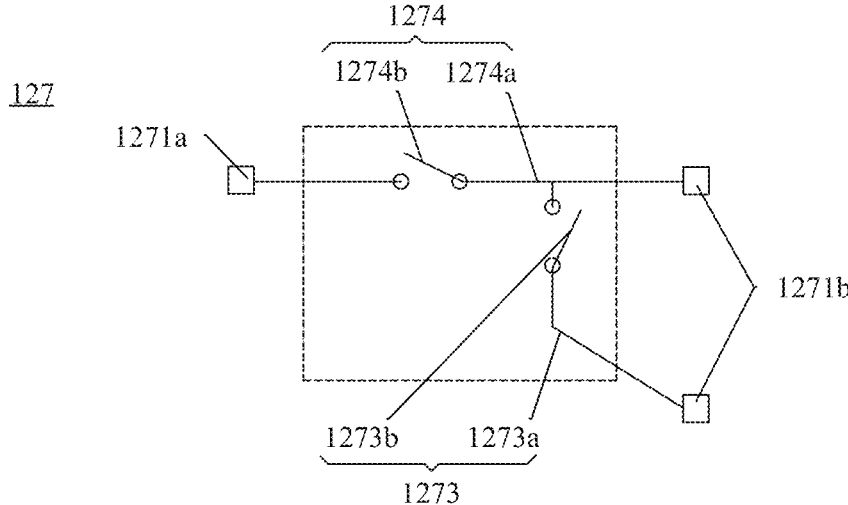
FIG. 8 is a schematic diagram of another structure of a switch assembly in the first radio frequency receiver shown in FIG. 3.
Figure 9:
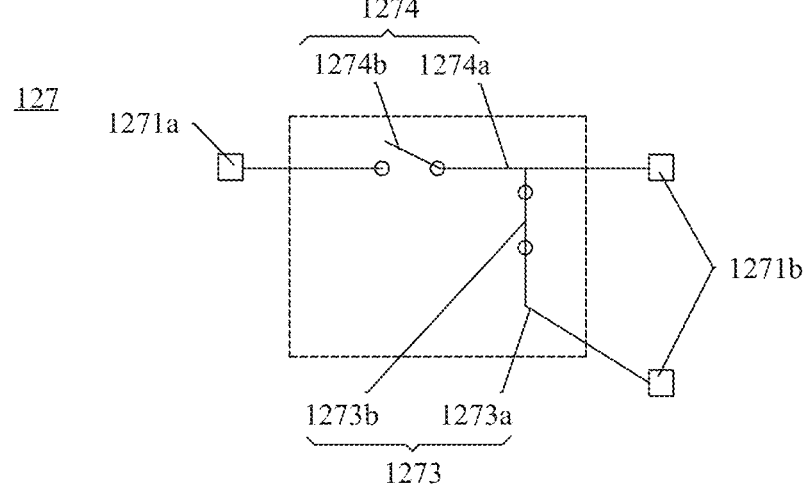
FIG. 9 is a schematic diagram when the switch assembly shown in FIG. 8 is in a first state.
Figure 10:
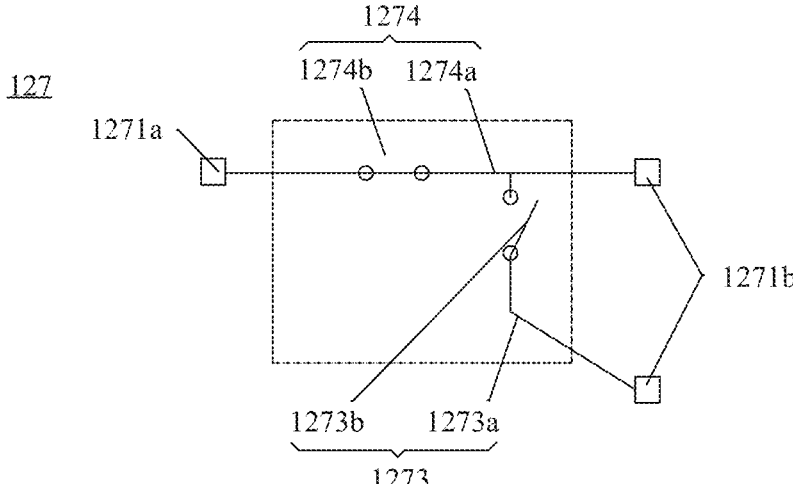
FIG. 10 is a schematic diagram when the switch assembly shown in FIG. 8 is in a second state.

In some examples, refer to FIG. 8. FIG. 8 is a schematic diagram of another structure of the switch assembly 127 in the first radio frequency receiver 12 shown in FIG. 3. The switch assembly 127 further includes a first connection structure 1273 and a second connection structure 1274. The first connection structure 1273 includes a first connection line 1273*a* and a first switch 1273*b*, the first connection line 1273*a* is connected between the two second end portions 1271*b*, and the first switch 1273*b* is connected in series in the first connection line 1273*a*. The second connection structure 1274 includes a second connection line 1274*a* and a second switch 1274*b*, the second connection line 1274*a* is connected between the first end portion 1271*a* and the one second end portion 1271*b* in the two second end portions 1271*b*, and the second switch 1274*b* is connected in series in the second connection line 1274*a*. Refer to FIG. 9. FIG. 9 is a schematic diagram when the switch assembly 127 shown in FIG. 8 is in a first state. When the switch assembly 127 is in the first state, the first switch 1273*b* is connected, so that the two second end portions 1271*b* are connected; and the second switch 1274*b* is simultaneously disconnected, so that the first end portion 1271*a* is disconnected from any second end portion 1271*b*. Refer to FIG. 10. FIG. 10 is a schematic diagram when the switch assembly 127 shown in FIG. 8 is in a second state. When the switch assembly 127 is in the second state, the second switch 1274*b* is connected, so that the first end portion 1271*a* is connected to the second end portion 1271*b* connected to an end portion of the second connection line 1274*a;* and the first switch 1273*b* is simultaneously disconnected, so that the two second end portions 1271*b* are disconnected. Specifically, the first switch 1273*b* and the second switch 1274*b* are single-pole single-throw switches. Optionally, the first switch 1273*b* and the second switch 1274*b* may be relay switches; or the first switch 1273*b* and the second switch 1274*b* may be MOS tube switches; or the first switch 1273*b* and the second switch 1274*b* may be mechanical switches.

Figure 11:
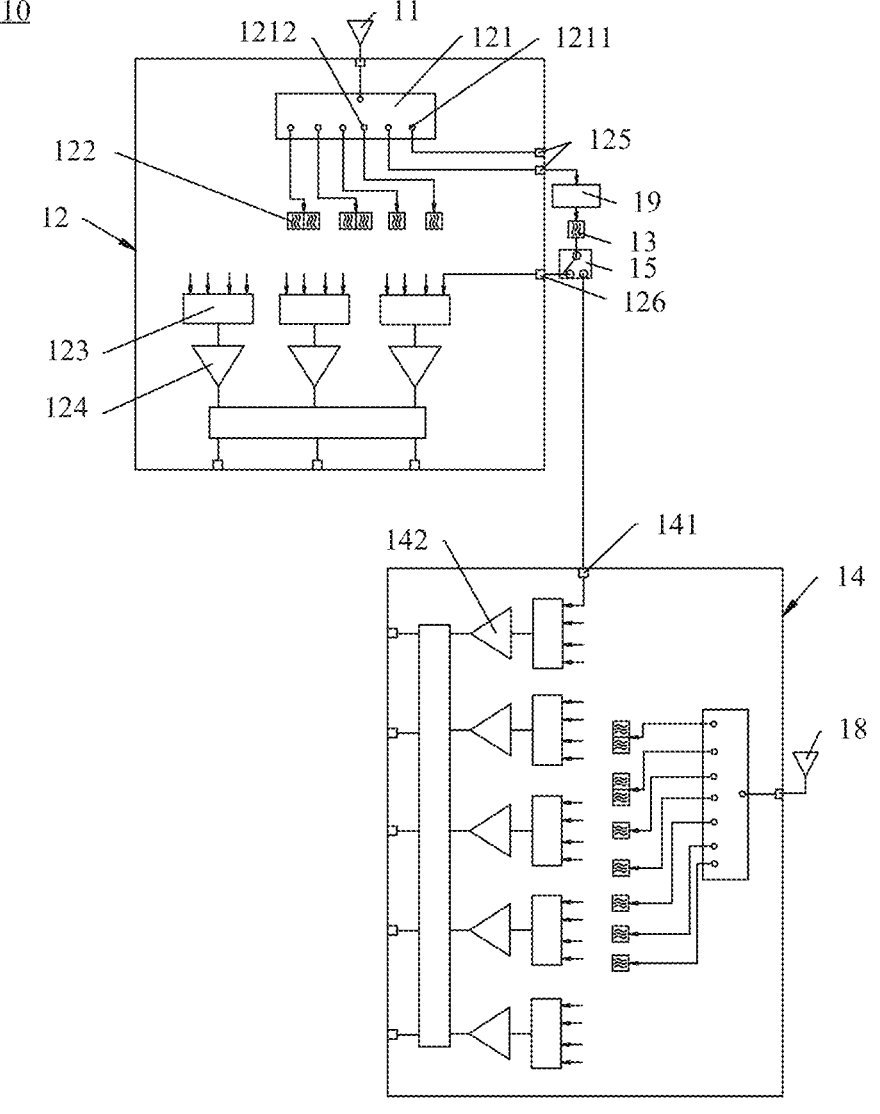
FIG. 11 is a schematic diagram of a radio frequency receiving system of a terminal device according to still other embodiments of this application.

The foregoing examples use an example in which the switch assembly 127 is integrated into the first radio frequency receiver 12 for description. In other embodiments, refer to FIG. 11. FIG. 11 is a schematic diagram of a radio frequency receiving system 10 of a terminal device 100 according to still other embodiments of this application. In the radio frequency receiving system 10, a switch assembly 127 may alternatively not be integrated into a first radio frequency receiver 12. The radio frequency receiving system 10 further includes a second single-pole double-throw switch 15. The second single-pole double-throw switch 15, the first radio frequency receiver 12, and a second radio frequency receiver 14 are discretely arranged on a circuit board of the terminal device 100. A movable end of the second single-pole double-throw switch 15 is connected to an output end of a second filter 13. One non-movable end of the second single-pole double-throw switch 15 is connected to one second port 126, and the second port 126 is connected to one input end in an input end group of a plurality of second selector switches 123. An other non-movable end of the second single-pole double-throw switch 15 is connected to a sixth port 141 of the second radio frequency receiver 14.

In this way, if the sixth port 141 of the second radio frequency receiver 14 is connected to the output end of the second filter 13 through the second single-pole double-throw switch 15, the first radio frequency receiver 12 can receive band signals whose quantity is greater than a quantity of first amplifiers 124, and the band signals are respectively transmitted, to a processing circuit of the terminal device 100, from a plurality of signal links of a plurality of first amplifiers 124 in the first radio frequency receiver 12 and a signal link in which the second filter 13 is connected to a second amplifier 142, to implement corresponding CA combinations. If the second port 126 of the first radio frequency receiver 12 is connected to the output end of the second filter 13 through the second single-pole double-throw switch 15, the first radio frequency receiver 12 can receive band signals whose quantity is less than or equal to the quantity of first amplifiers 124, and the band signals include a band signal gated by the second filter 13, where the band signals each can be transmitted from the plurality of first amplifiers 124 in the first radio frequency receiver 12 to the processing circuit of the terminal device 100. In this way, the first amplifiers 124 in the first radio frequency receiver 12 are fully utilized, and an unnecessary insertion loss caused by transmitting a signal in a channel of the second filter 13 from the second radio frequency receiver 14 to the processing circuit of the terminal device 100 is avoided. However, the second single-pole double-throw switch 15 is arranged in the radio frequency receiving system 10, and the second single-pole double-throw switch 15, the first radio frequency receiver 12, and the second radio frequency receiver 14 are discretely arranged, which increase difficulties of designing, processing, and assembling the circuit board of the terminal device 100.

Figure 12:
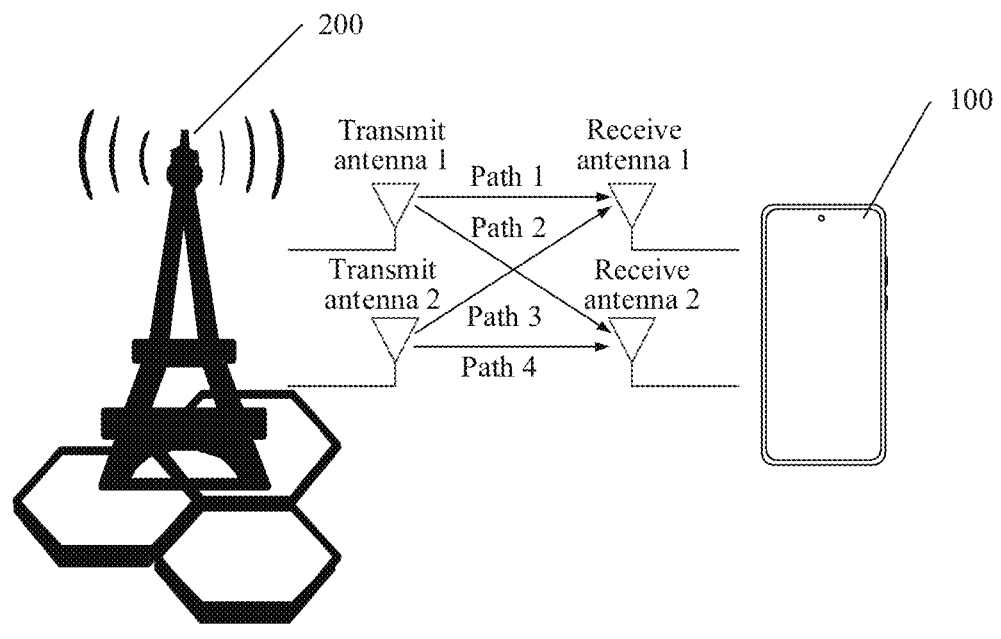
FIG. 12 is a schematic diagram of a MIMO communication scenario according to some embodiments of this application.

One manner for providing a communication rate is to introduce a carrier aggregation technology in a communication system. Another manner for improving the communication rate is to use a multiple input multiple output (multiple input multiple output, MIMO) technology in LTE networking to improve a channel capacity, to increase a data throughput. An antenna form used in MIMO is an antenna system using a plurality of antennas at both a transmit end and a receive end to form a plurality of transmitting and receiving paths between transmitting and receiving devices. Refer to FIG. 12. FIG. 12 is a diagram of an architecture of a MIMO communication scenario according to some embodiments of this application. In FIG. 12, for example, a transmit end using a base station 200 as an example and a receive end using a terminal device 100 as an example each have two antennas. The base station 200 transmits signals through a transmit antenna 1 and a transmit antenna 2, and the terminal device 100 receives the signals through a receive antenna 1 and a receive antenna 2. It can be seen that, the terminal device 100 uses the MIMO technology, so that a quantity of antennas on the terminal device 100 is multiple. Therefore, a quantity of radio frequency receivers in the terminal device 100 is also multiple, and the radio frequency receivers are in a one-to-one correspondence with the antennas, to achieve reception of receiving signals of the plurality of antennas.

Figure 13:
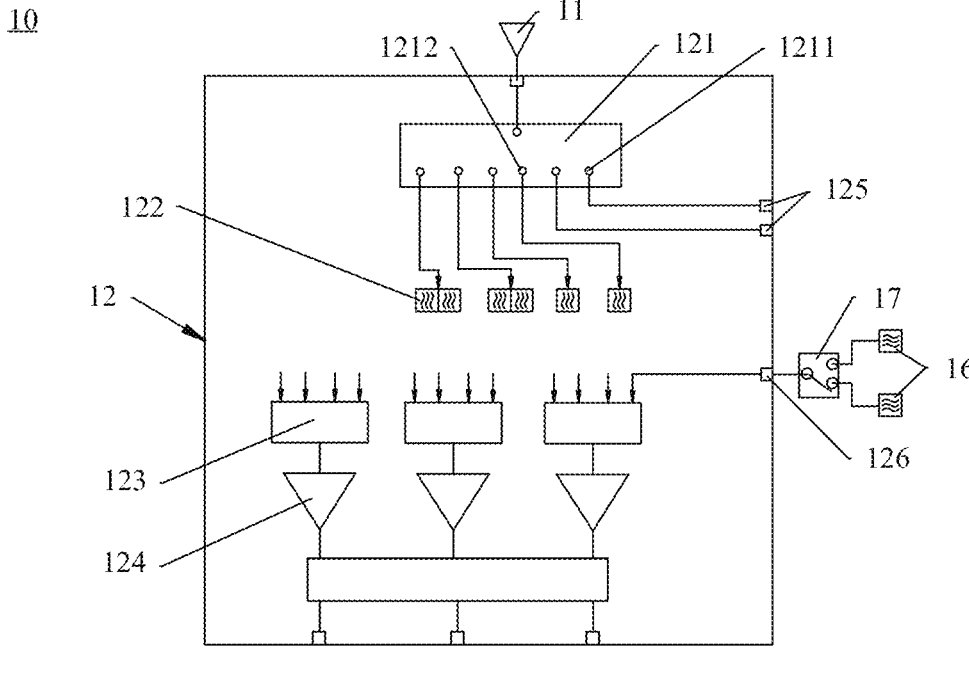
FIG. 13 is a schematic diagram of a radio frequency receiving system of a terminal device according to still other embodiments of this application.

Refer to FIG. 13. FIG. 13 is a schematic diagram of a radio frequency receiving system 10 of a terminal device 100 according to still other embodiments of this application. In the terminal device 100 using a MIMO technology, if a quantity of band signals received by a first radio frequency receiver 12 from a first antenna 11 is less than a quantity of first amplifiers 124, at least one first amplifier 124 is idle in the first radio frequency receiver 12. To improve utilization of first amplifiers 124 in the first radio frequency receiver 12 to reduce a total quantity of amplifiers in the radio frequency receiving system 10, the radio frequency receiving system 10 may further include two third filters 16. Frequency ranges that can be gated by the two third filters 16 may be respectively the same as frequency ranges that can be gated by a plurality of first filters 122. For example, if the first radio frequency receiver 12 includes first filters 122 that can gate a B39 signal and a B3 signal, the two third filters 16 may also be respectively filters that can gate the B39 signal and the B3 signal. To implement a MIMO multi-channel receiving function of the B39 signal or the B3 signal, the radio frequency receiving system 10 further includes a third single-pole double-throw switch 17. Input ends of the two third filters 16 are connected to another antenna (such as a second antenna 18 or another antenna not shown in the figure) than the first antenna 11 in the radio frequency receiving system 10, and output ends of the two third filters 16 are respectively connected to two non-movable ends of the third single-pole double-throw switch 17. A movable end of the third single-pole double-throw switch 17 is connected to one second port 126 of the first radio frequency receiver 12, and the second port 126 is connected to one input end group in an input end group of a plurality of second selector switches 123.

In this way, the movable end of the third single-pole double-throw switch 17 can be connected to one of the two non-movable ends, so that a band signal gated by one third filter 16 can be transmitted from one first amplifier 124 in the first radio frequency receiver 12 to a processing circuit of the terminal device 100. In this way, the utilization of the first amplifiers 124 is improved, and the total quantity of amplifiers in the radio frequency receiving system 10 is also reduced, thereby saving the cost of the terminal device 100.

It can be known according to the foregoing descriptions that, if a switch assembly 127 is not integrated into the first radio frequency receiver 12 and the terminal device 100 intends to implement CA combinations including a band signal gated by a second filter 13, a second single-pole double-throw switch 15 is required to be discretely arranged outside the first radio frequency receiver 12. If the terminal device 100 using the MIMO technology intends to improve the utilization of the first amplifiers 124 in the first radio frequency receiver 12, a third single-pole double-throw switch 17 is required to be discretely arranged outside the first radio frequency receiver 12. Therefore, difficulties of designing and assembling the terminal device 100 applicable to communication systems of different operators in different regions are increased.

Figure 14:
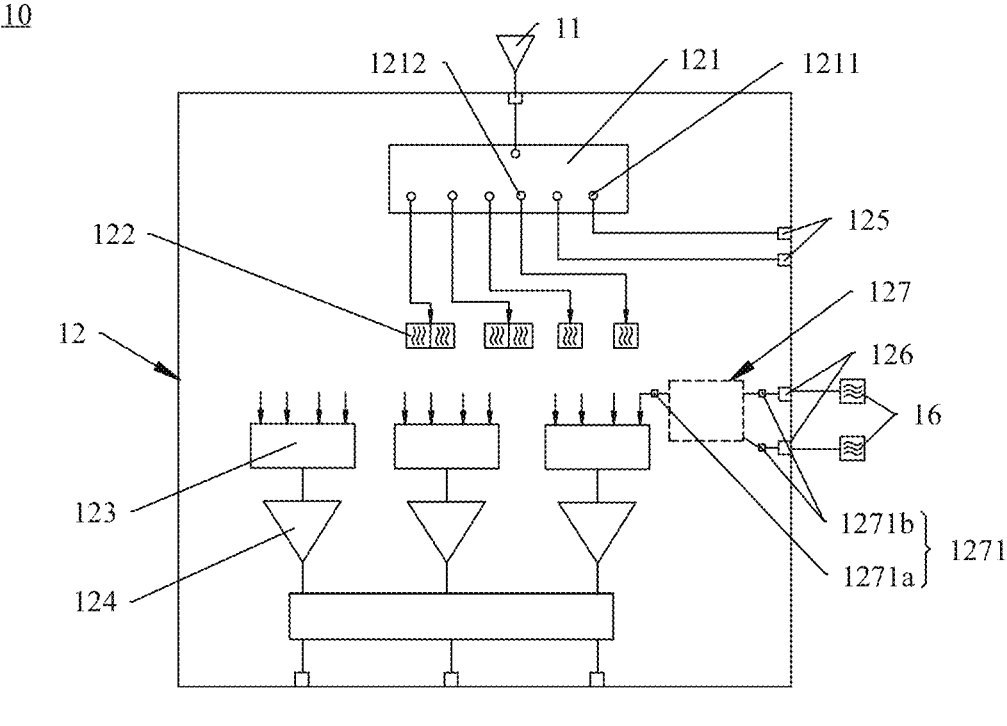
FIG. 14 is a schematic diagram of a radio frequency receiving system of a terminal device according to still other embodiments of this application.

To resolve the foregoing problems, refer to FIG. 14. FIG. 14 is a schematic diagram of a radio frequency receiving system 10 of a terminal device 100 according to still other embodiments of this application. The foregoing switch assembly 127 is further capable of switching to a third state. When the switch assembly 127 is in the third state, a first end portion 1271a is connected to an other second end portion 1271b of two second end portions 1271b, the first end portion 1271a is disconnected from one second end portion 1271b in the two second end portions 1271b, and the two second end portions 1271b are disconnected. The one second end portion 1271b herein refers to the second end portion 1271b connected to the second port 126 connected to the output end of the second filter 13 when the radio frequency receiving system 10 includes the second filter 13 in the foregoing descriptions. In this way, in the terminal device 100 using a MIMO technology, when the switch assembly 127 is in a second state, one second port 126 in two second ports 126 can be connected to an input end of one second selector switch 123. If the second port 126 is connected to one third filter 16 (so that the third filter 16 gates a B39 signal), two B39 signals can be transmitted from a first radio frequency receiver 12 to a processing circuit of the terminal device 100. When the switch assembly 127 is in the third state, an other second port 126 in the two second ports 126 can be connected to an input end of one second selector switch 123. If the second port 126 is connected to an other third filter 16 (so that the third filter 16 gates a B3 signal). two B3 signals can be transmitted from the first radio frequency receiver 12 to the processing circuit of the terminal device 100. In this way, utilization of first amplifiers 124 is improved. and a total quantity of amplifiers in the radio frequency receiving system 10 is also reduced. thereby saving the cost of the terminal device 100.

It can be known according to foregoing descriptions that. in the first radio frequency receiver 12 provided in some embodiments of this application. a second single-pole double-throw switch 15 or a third single-pole double-throw switch 17 is not required to be discretely arranged outside the first radio frequency receiver 12. The switch assembly 127 is integrated into the first radio frequency receiver 12. and the switch assembly 127 can switch among a first state. the second state, and the third state. In this way, when CA combinations in which a quantity of band signals is greater than a quantity of first amplifiers 124 are required to be implemented. the first radio frequency receiver 12 can use a second amplifier 142 in a second radio frequency receiver 14 in the radio frequency receiving system 10. to transmit a band signal gated by the second filter 13 discretely arranged outside the first radio frequency receiver 12 to the processing circuit of the terminal device 100. In addition, when the terminal device 100 needs to implement CA combinations in which a quantity of band signals is less than or equal to the quantity of first amplifiers 124. and the band signals include the band signal gated by the second filter 13. the band signal gated by the second filter 13 can be transmitted from a first amplifier 124 in the first radio frequency receiver 12 to the processing circuit of the terminal device 100, thereby optimizing an insertion loss of the channel of the second filter 13. In addition, a plurality of band signals from different antennas can be received in the terminal device 100 using the MIMO technology. In this way; utilization of the first amplifiers 124 is improved. and a total quantity of amplifiers in the radio frequency receiving system 10 is also reduced. thereby saving the cost of the terminal device 100. Therefore, the first radio frequency receiver 12 can be used in the terminal device 100 with a variety of usage scenarios, so that difficulties of designing and assembling the terminal device 100 are simplified. a degree of integration is high. and applicability is strong.

The switch assembly 127 has a plurality of structures to be capable of switching among the first state. the second state, and the third state.

Figure 15:
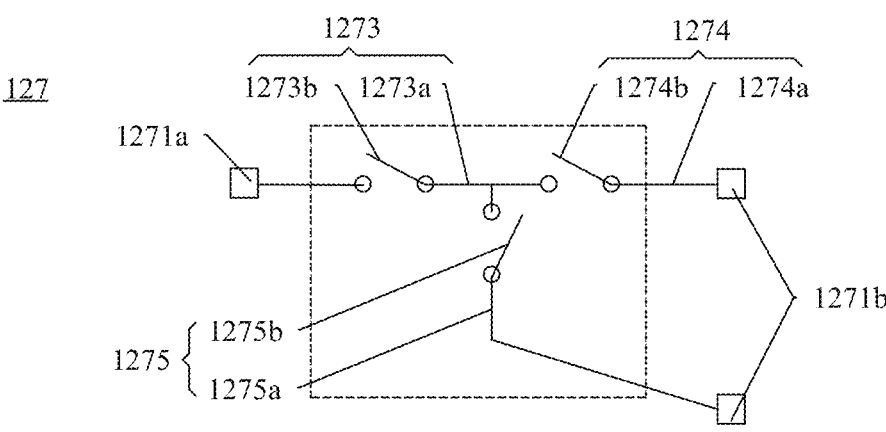
FIG. 15 is a schematic diagram of still another structure of a switch assembly in the first radio frequency receiver shown in FIG. 3.

In some embodiments. refer to FIG. 15. FIG. 15 is a schematic diagram of still another structure of the switch assembly 127 in the first radio frequency receiver 12 shown in FIG. 3. The switch assembly 127 includes a first connection structure 1273. a second connection structure 1274. and a third connection structure 1275. The first connection structure 1273 includes a first connection line 1273a and a first switch 1273b. The second connection structure 1274 includes a second connection line 1274a and a second switch 1274b. The third connection structure 1275 includes a third connection line 1275a and a third switch 1275b. One end of the first connection line 1273a, one end of the second connection line 1274a, and one end of the third connection line 1275a are connected, an other end of the first connection line 1273a is connected to the one first end portion 1271a, and an other end of the second connection line 1274a and an other end of the third connection line 1275a are respectively connected to the two second end portions 1271b. The first switch 1273b is connected in series in the first connection line 1273a, the second switch 1274b is connected in series in the second connection line 1274a, and the third switch 1275b is connected in series in the third connection line 1275a.

Figure 16:
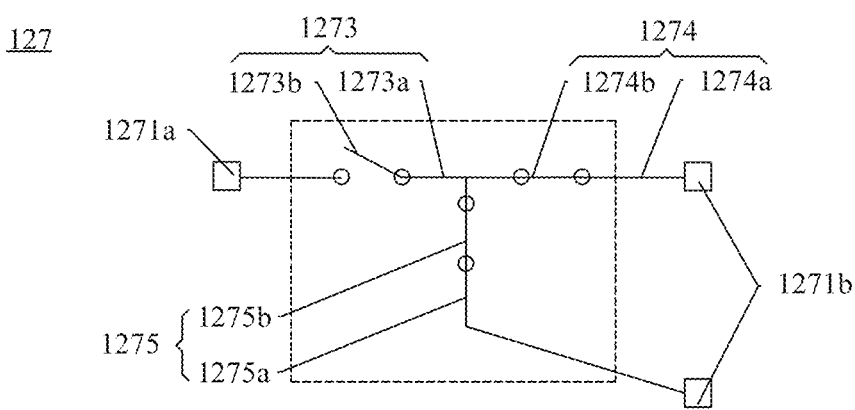
FIG. 16 is a schematic diagram when the switch assembly shown in FIG. 15 is in a first state.
Figure 17:
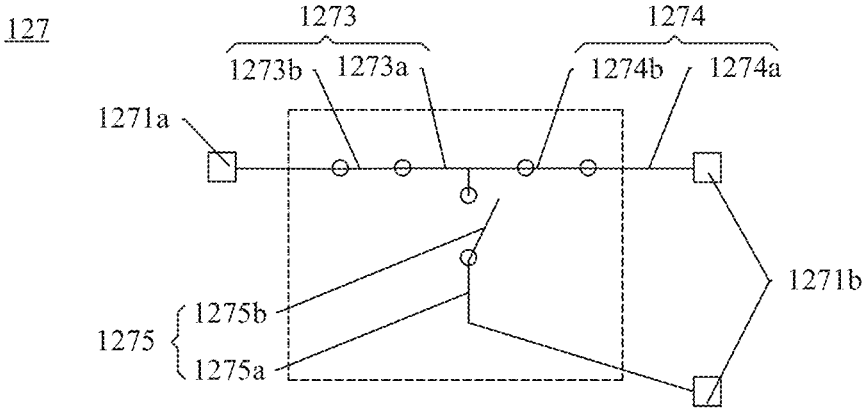
FIG. 17 is a schematic diagram when the switch assembly shown in FIG. 15 is in a second state.
Figure 18:
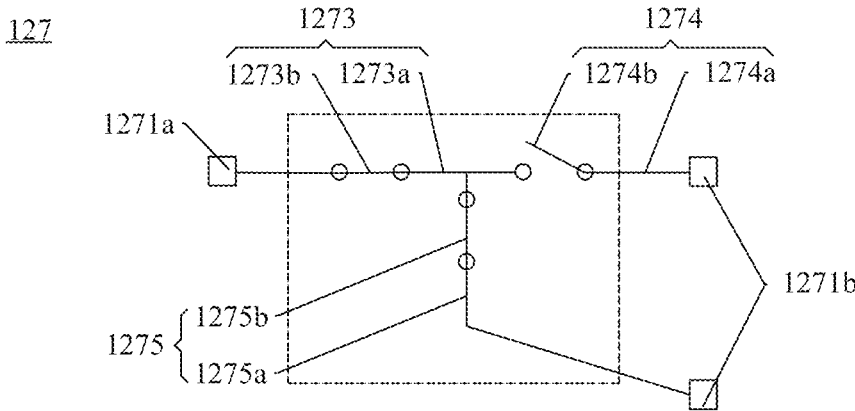
FIG. 18 is a schematic diagram when the switch assembly shown in FIG. 15 is in a third state.

Refer to FIG. 16. FIG. 16 is a schematic diagram when the switch assembly 127 shown in FIG. 15 is in a first state. When the switch assembly 127 is in the first state, the second switch 1274b and the third switch 1275b are connected, so that the two second end portions 1271b are connected; and the first switch 1273b is simultaneously disconnected, so that the first end portion 1271a is disconnected from any second end portion 1271b. Refer to FIG. 17. FIG. 17 is a schematic diagram when the switch assembly 127 shown in FIG. 15 is in a second state. When the switch assembly 127 is in the second state, the first switch 1273b and the second switch 1274b are connected, so that the first end portion 1271a is connected to the second end portion 1271b connected to an end portion of the second connection line 1274a; and the third switch 1275b is simultaneously disconnected, so that the two second end portions 1271b are disconnected. Refer to FIG. 18. FIG. 18 is a schematic diagram when the switch assembly 127 shown in FIG. 15 is in a third state. When the switch assembly 127 is in the third state, the first switch 1273b and the third switch 1275b are connected, so that the first end portion 1271a is connected to the second end portion 1271b connected to an end portion of the third connection line 1275a; and the second switch 1274b is simultaneously disconnected, so that the two second end portions 1271b are disconnected. Specifically, a structure of the third switch 1275b is the same as structures of the first switch 1273b and the second switch 1274b, the structures of the first switch 1273b and the second switch 1274b are as described above, and details are not described herein again.

Figure 19:
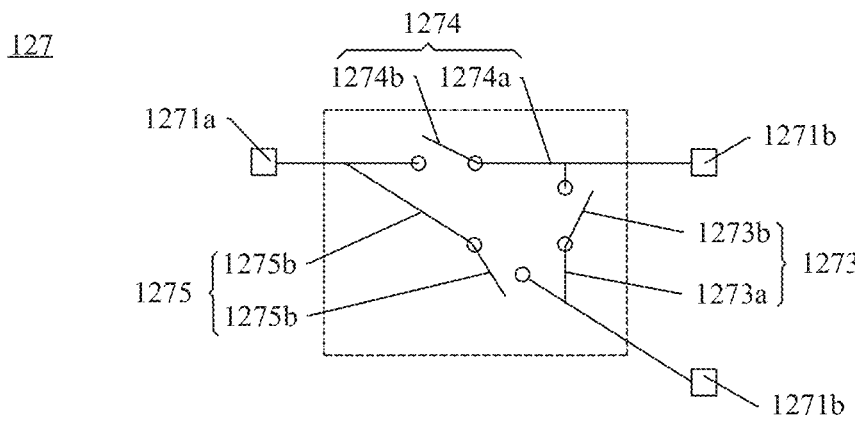
FIG. 19 is a schematic diagram of still another structure of a switch assembly in the first radio frequency receiver shown in FIG. 3.

In some other embodiments, refer to FIG. 19. FIG. 19 is a schematic diagram of still another structure of the switch assembly 127 in the first radio frequency receiver 12 shown in FIG. 3. The switch assembly 127 includes a first connection structure 1273, a second connection structure 1274, and a third connection structure 1275. The first connection structure 1273 includes a first connection line 1273a and a first switch 1273b, the first connection line 1273a is connected between the two second end portions 1271b, and the first switch 1273b is connected in series in the first connection line 1273a. The second connection structure 1274 includes a second connection line 1274a and a second switch 1274b, the second connection line 1274a is connected between the first end portion 1271a and the one second end portion 1271b in the two second end portions 1271b, and the second switch 1274b is connected in series in the second connection line 1274a. The third connection structure 1275 includes a third connection line 1275a and a third switch 1275b, the third connection line 1275a is connected between the first end portion 1271a and the other second end portion 1271b in the two second end portions 1271b, and the third switch 1275b is connected in series in the third connection line 1275a.

Figure 20:
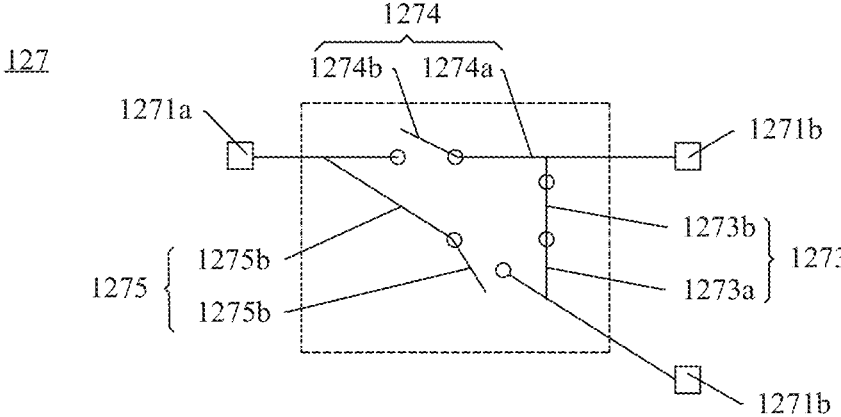
FIG. 20 is a schematic diagram when the switch assembly shown in FIG. 19 is in a first state.
Figure 21:
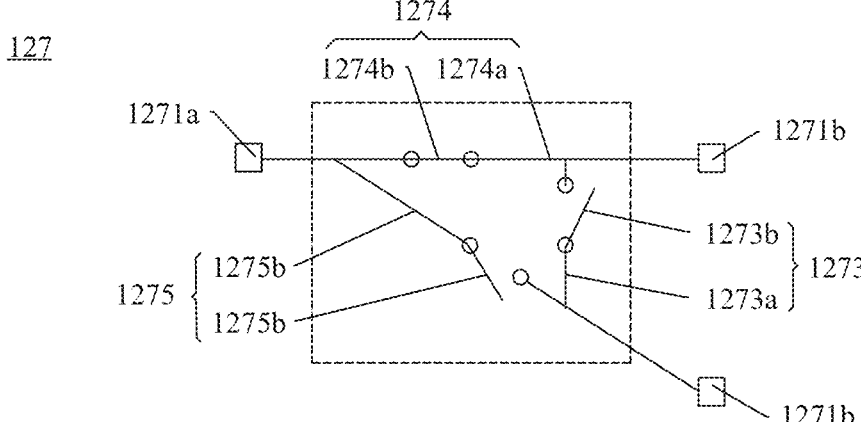
FIG. 21 is a schematic diagram when the switch assembly shown in FIG. 19 is in a second state.
Figure 22:
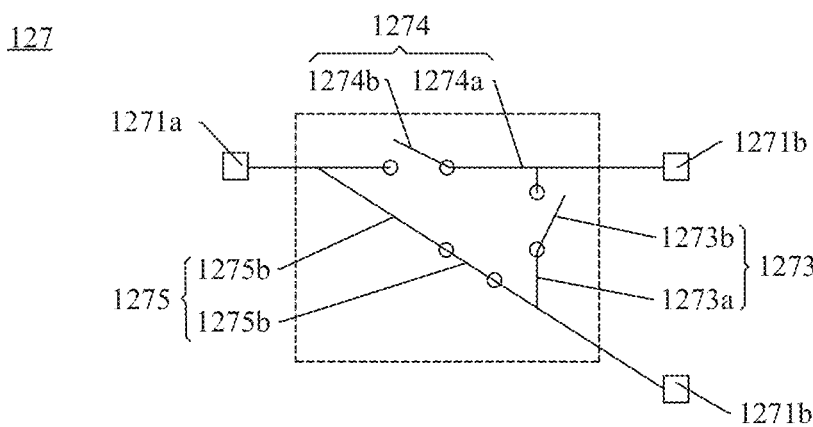
FIG. 22 is a schematic diagram when the switch assembly shown in FIG. 19 is in a third state.

Refer to FIG. 20. FIG. 20 is a schematic diagram when the switch assembly 127 shown in FIG. 19 is in a first state. When the switch assembly 127 is in the first state, the first switch 1273b is connected, so that the two second end portions 1271b are connected; and the second switch 1274b and the third switch 1275b are simultaneously disconnected, so that the first end portion 1271a is disconnected from any second end portion 1271b. Refer to FIG. 21. FIG. 21 is a schematic diagram when the switch assembly 127 shown in FIG. 19 is in a second state. When the switch assembly 127 is in the second state, the second switch 1274b is connected, so that the first end portion 1271a is connected to the second end portion 1271b connected to an end portion of the second connection line 1274a; and the first switch 1273b and the third switch 1275b are simultaneously disconnected, so that the two second end portions 1271b are disconnected. Refer to FIG. 22. FIG. 22 is a schematic diagram when the switch assembly 127 shown in FIG. 19 is in a third state. When the switch assembly 127 is in the third state, the third switch 1275b is connected, so that the first end portion 1271a is connected to the second end portion 1271b connected to an end portion of the third connection line 1275a; and the first switch 1273b and the second switch 1274b are simultaneously disconnected, so that the two second end portions 1271b are disconnected. Specifically, a structure of the third switch 1275b is the same as structures of the first switch 1273b and the second switch 1274b, the structures of the first switch 1273b and the second switch 1274b are as described above, and details are not described herein again. In the embodiments, by controlling a switch, connection or disconnection of a corresponding connection structure can be controlled, to control connection or disconnection between two end portions 1271 connected to two ends of the connection structure, so that components required to be controlled are less, and a controlling difficulty is lower.

Figure 23:
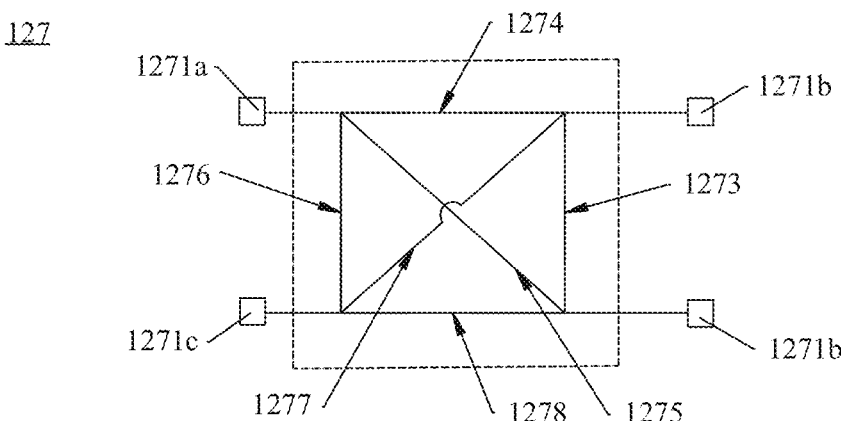
FIG. 23 is a schematic diagram of a structure of a switch assembly according to still other embodiments of this application.
Figure 24:
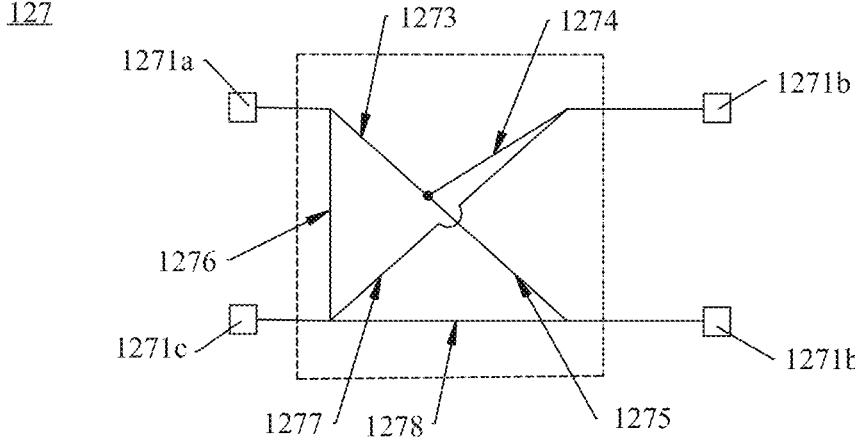
FIG. 24 is a schematic diagram of a structure of a switch assembly according to still other embodiments of this application.

Based on the foregoing embodiments, in some embodiments, refer to FIG. 23 and FIG. 24. FIG. 23 is a schematic diagram of a structure of the switch assembly 127 according to still other embodiments of this application. FIG. 24 is a schematic diagram of a structure of the switch assembly 127 according to still other embodiments of this application. In FIG. 23 and FIG. 24, only connection structures between various end portions 1271 are shown, and switches connected in series in connection lines of the connection structures are not shown. The at least three end portions 1271 further include one third end portion 1271c. The switch assembly 127 further includes a fourth connection structure 1276, a fifth connection structure 1277, and a sixth connection structure 1278. The fourth connection structure 1276 includes a fourth connection line and a fourth switch, the fourth connection line is connected between the third end portion 1271c and the first end portion 1271a, and the fourth switch is connected in series in the fourth connection line. The fifth connection structure 1277 includes a fifth connection line and a fifth switch, the fifth connection line is connected between the third end portion 1271c and the one second end portion 1271b in the two second end portions 1271b, and the fifth switch is connected in series in the fifth connection line. The sixth connection structure 1278 includes a sixth connection line and a sixth switch, the sixth connection line is connected between the third end portion 1271c and the other second end portion 1271b in the two second end portions 1271*b*, and the sixth switch is connected in series in the sixth connection line. Specifically, structures of the fourth switch, the fifth switch, and the sixth switch are the same as structures of the first switch 1273*b*, the second switch 1274*b*, and the third switch 1275*b*, the structures of the first switch 1273*b* and the second switch 1274*b* are as described above, and details are not described herein again.

When the switch assembly 127 is in the first state, the second state, and the third state, connection and disconnection of the first switch, the second switch, and the third switch are as described in the foregoing embodiments, and details are not described herein again. It should be noted that, when the switch assembly 127 is in the first state, the second state, and the third state, the fourth switch, the fifth switch, and the sixth switch each are required to be simultaneously disconnected. In this way, the switch assembly 127 has more end portions 1271, and each two end portions 1271 can be connected or disconnected. In this way, the first radio frequency receiver 12 can be used in the terminal device 100 with more usage scenarios, so that difficulties of designing and assembling of the terminal device 100 are simplified, a degree of integration is high, and applicability is strong.

Figure 25:
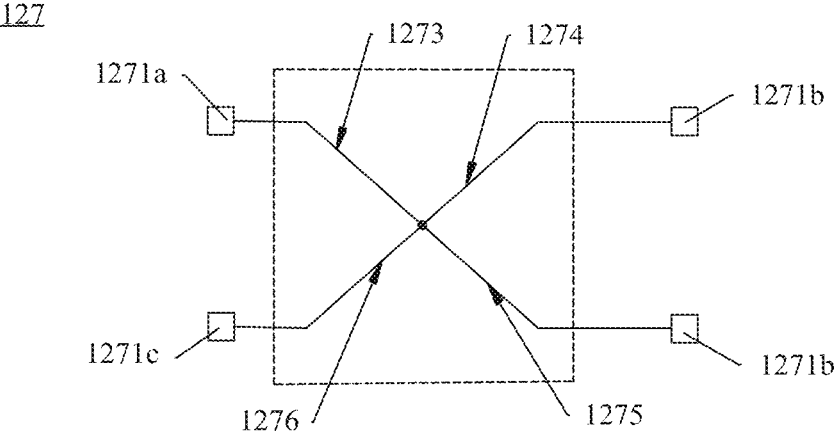
FIG. 25 is a schematic diagram of a structure of a switch assembly according to still other embodiments of this application.

In some other embodiments, refer to FIG. 25. FIG. 25 is a schematic diagram of a structure of the switch assembly 127 according to still other embodiments of this application. In FIG. 25, only connection structures between various end portions 1271 are shown, and switches connected in series in connection lines of the connection structures are not shown. The at least three end portions 1271 further include one third end portion 1271*c*. The switch assembly 127 further includes a fourth connection structure 1276. The fourth connection structure 1276 includes a fourth connection line and a fourth switch. One end of the fourth connection line is connected to the one end of the first connection line, the one end of the second connection line, and the one end of the third connection line, and an other end of the fourth connection line is connected to the third end portion 1271*c*. The fourth switch is connected in series in the fourth connection line. Specifically, structures of the fourth switch, the fifth switch, and the sixth switch are the same as structures of the first switch 1273*b*, the second switch 1274*b*, and the third switch 1275*b*, the structures of the first switch 1273*b* and the second switch 1274*b* are as described above, and details are not described herein again.

When the switch assembly 127 is in the first state, the second state, and the third state, connection and disconnection of the first switch, the second switch, and the third switch are as described in the foregoing embodiments, and details are not described herein again. It should be noted that, when the switch assembly 127 is in the first state, the second state, and the third state, the fourth switch is required to be simultaneously disconnected. In this way, the switch assembly 127 has more end portions 1271, and each two end portions 1271 can be connected or disconnected. In this way, the first radio frequency receiver 12 can be used in the terminal device 100 with more usage scenarios, so that difficulties of designing and assembling of the terminal device 100 are simplified, a degree of integration is high, and applicability is strong.

Figure 26:
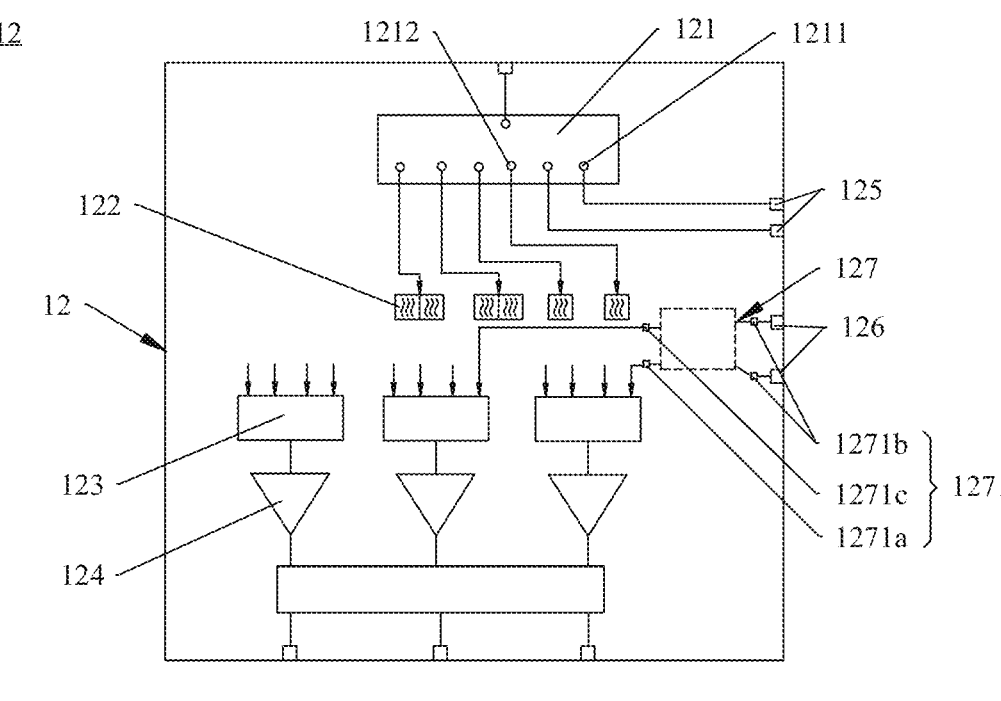
FIG. 26 is a schematic diagram of a first radio frequency receiver according to some other embodiments of this application.

Specifically, in some embodiments, refer to FIG. 26. FIG. 26 is a schematic diagram of a first radio frequency receiver 12 according to some other embodiments of this application. One third end portion 1271*c* is connected to one input end in the input end group of the plurality of second selector switches 123. It should be noted that, the third end portion 1271*c* and the first end portion 1271*a* are respectively connected to input ends of two second selector switches 123. In this way, when the radio frequency receiving system 10 needs to implement CA combinations including the band signal gated by the second filter 13, a first amplifier 124 configured to transmit the band signal gated by the second filter 13 can be flexibly selected. Similarly, when the radio frequency receiving system 10 is used in the terminal device 100 using the MIMO technology to simultaneously receive band signals from different antennas, a first amplifier 124 configured to transmit a band signal gated by the third filter 16 can be flexibly selected, thereby enhancing applicability of the first radio frequency receiver 12.

Figure 27:
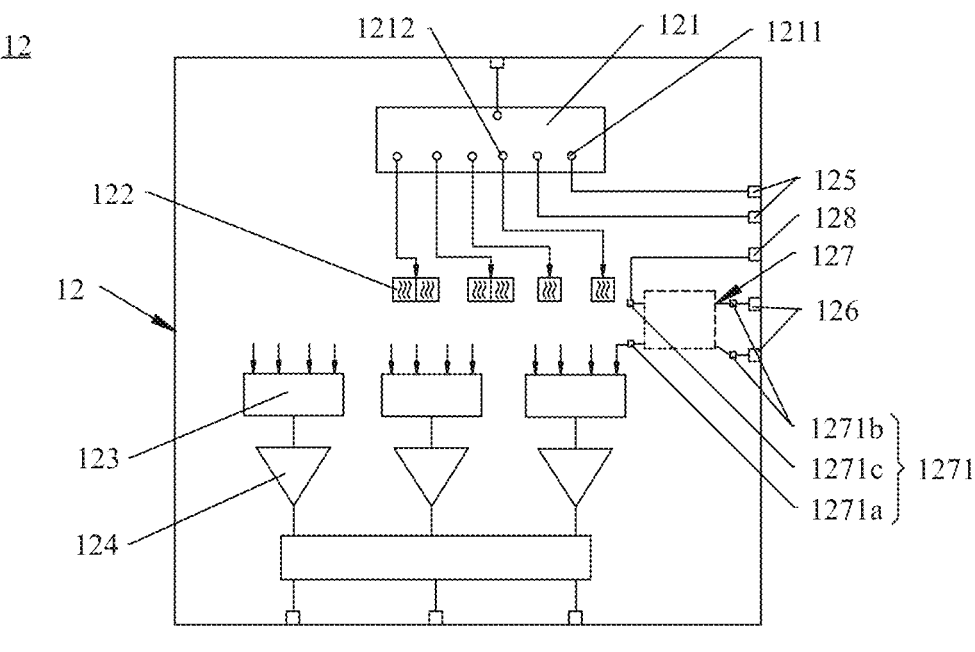
FIG. 27 is a schematic diagram of a first radio frequency receiver according to still other embodiments of this application.
Figure 28:
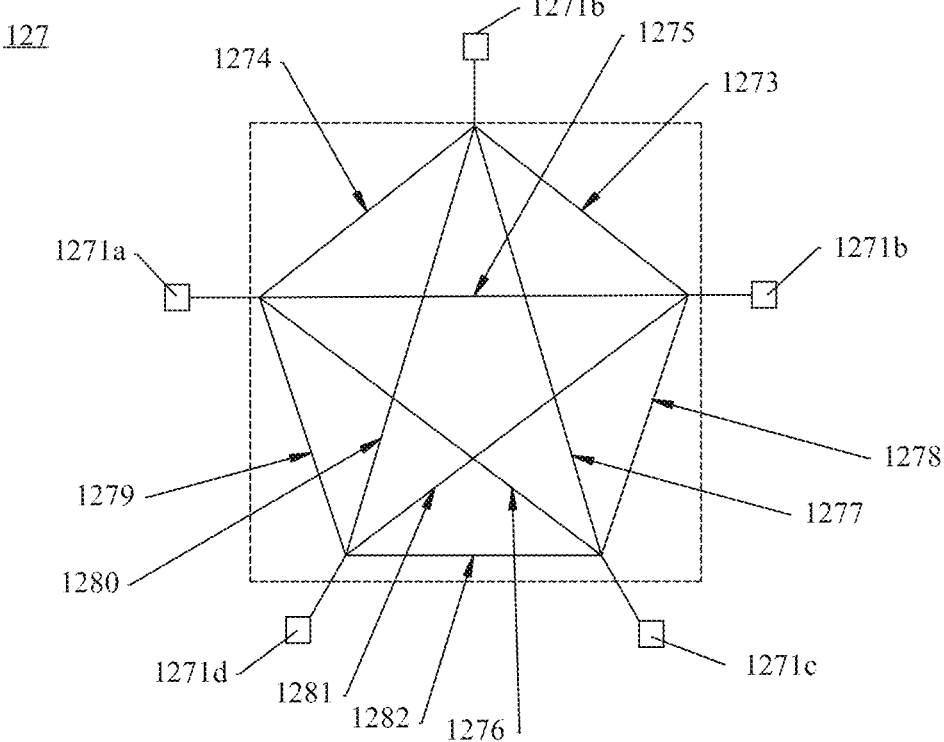
FIG. 28 is a schematic diagram of a structure of a switch assembly according to still other embodiments of this application.

In some other embodiments, refer to FIG. 27. FIG. 27 is a schematic diagram of a first radio frequency receiver 12 according to some other embodiments of this application. FIG. 28 is. The first radio frequency receiver 12 further includes one third port 128; and the one third end portion 1271*c* is connected to the one third port 128. In this way, the third port 128 of the first radio frequency receiver 12 can be connected to an output end of one third filter 16, one second port 126 can be connected to an output end of the second filter 13, and an other second port 126 can be connected to the sixth port 141. In this way, the first radio frequency receiver 12 can be used in the terminal device 100 using both a MIMO technology and a CA technology, and specifically, the switch assembly 127 can be selected to transmit band signals in CA combinations or MIMO band signals based on a communication system of an operator accessed by the terminal device 100, thereby enhancing applicability of the first radio frequency receiver 12.

Based on the foregoing embodiments, in some embodiments, refer to FIG. 28. FIG. 28 is a schematic diagram of a structure of the switch assembly 127 according to still other embodiments of this application. In FIG. 28, only connection structures between various end portions 1271 are shown, and switches connected in series in connection lines of the connection structures are not shown. The at least three end portions 1271 further include one fourth end portion 1271*d*. The switch assembly 127 further includes a seventh connection structure 1279, an eighth connection structure 1280, a ninth connection structure 1281, and a tenth connection structure 1282. The seventh connection structure 1279 includes a seventh connection line and a seventh switch, the seventh connection line is connected between the fourth end portion 1271*d* and the first end portion 1271*a*, and the seventh switch is connected in series in the seventh connection line. The eighth connection structure 1280 includes an eighth connection line and an eighth switch, the eighth connection line is connected between the fourth end portion 1271*d* and the one second end portion 1271*b* in the two second end portions 1271*b*, and the eighth switch is connected in series in the eighth connection line. The ninth connection structure 1281 includes a ninth connection line and a ninth switch, the ninth connection line is connected between the fourth end portion 1271*d* and the other second end portion 1271*b* in the two second end portions 1271*b*, and the ninth switch is connected in series in the ninth connection line. The tenth connection structure 1282 includes a tenth connection line and a tenth switch, the tenth connection line is connected between the fourth end portion 1271*d* and the third end portion 1271*c*, and the tenth switch is connected in series in the tenth connection line.

When the switch assembly 127 is in the first state, the second state, and the third state, connection and disconnection of the first switch, the second switch, and the third switch are as described in the foregoing embodiments, and details are not described herein again. It should be noted that, when the switch assembly 127 is in the first state, the second state, and the third state, the fourth switch, the fifth switch, the sixth switch, the seventh switch, the eighth switch, the ninth switch, and the tenth switch each are required to be simultaneously disconnected. In this way, the switch assembly 127 has more end portions 1271, and each two end portions 1271 can be connected or disconnected. In this way, the first radio frequency receiver 12 can be used in the terminal device 100 with more usage scenarios, so that difficulties of designing and assembling of the terminal device 100 are simplified, a degree of integration is high, and applicability is strong.

Figure 29:
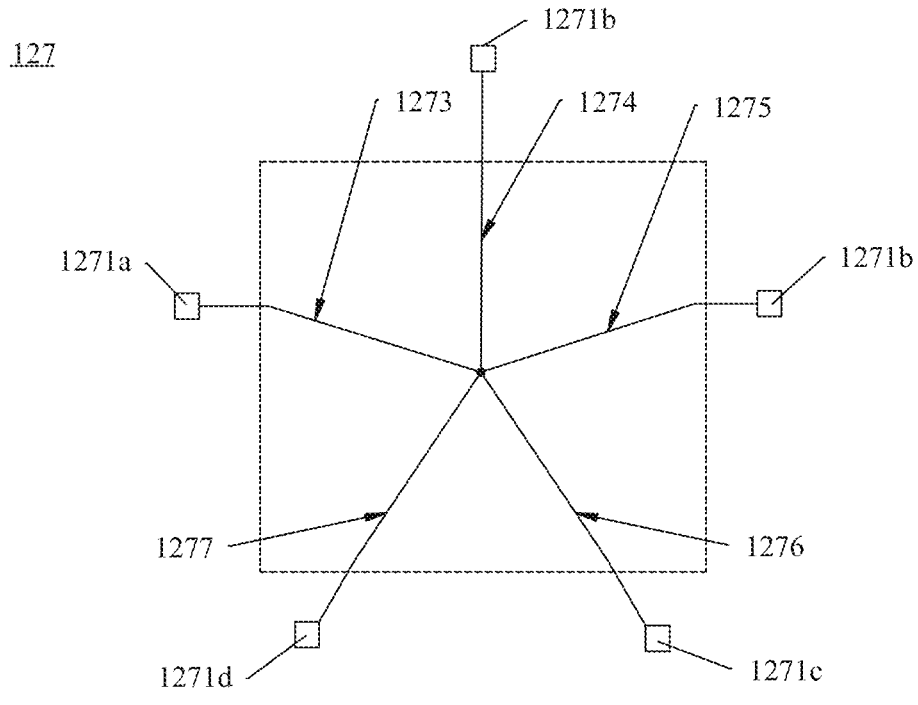
FIG. 29 is a schematic diagram of a structure of a switch assembly according to still other embodiments of this application.

In some other embodiments, refer to FIG. 29. FIG. 29 is a schematic diagram of a structure of the switch assembly 127 according to still other embodiments of this application. In FIG. 29, only connection structures between various end portions 1271 are shown, and switches connected in series in connection lines of the connection structures are not shown. The at least three end portions 1271 further include one fourth end portion 1271d. The switch assembly 127 further includes a fifth connection structure 1277. The fifth connection structure 1277 includes a fifth connection line and a fifth switch. One end of the fifth connection line is connected to the one end of the first connection line, the one end of the second connection line, the one end of the third connection line, and the one end of the fourth connection line, and an other end of the fifth connection line is connected to the fourth end portion 1271d. The fifth switch is connected in series in the fifth connection line.

When the switch assembly 127 is in the first state, the second state, and the third state, connection and disconnection of the first switch 1273b, the second switch 1274b, and the third switch 1275b are as described in the foregoing embodiments, and details are not described herein again. It should be noted that, when the switch assembly 127 is in the first state, the second state, and the third state, the fourth switch and the fifth switch are required to be simultaneously disconnected. In this way, the switch assembly 127 has more end portions 1271, and each two end portions 1271 can be connected or disconnected. In this way, the first radio frequency receiver 12 can be used in the terminal device 100 with more usage scenarios, so that difficulties of designing and assembling of the terminal device 100 are simplified, a degree of integration is high, and applicability is strong.

Figure 30:
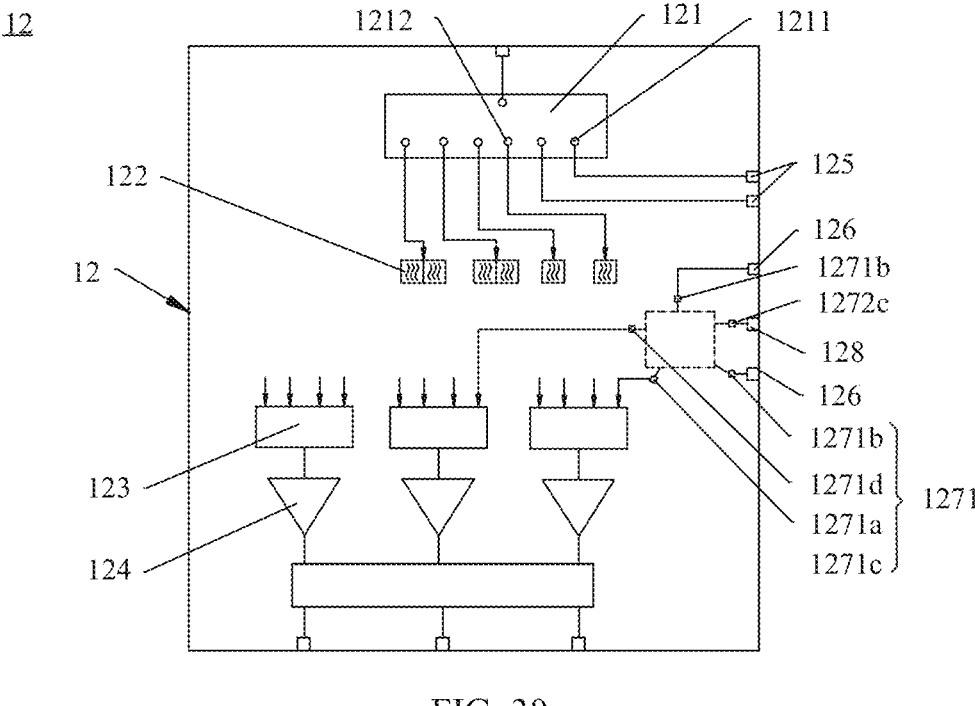
FIG. 30 is a schematic diagram of a first radio frequency receiver according to still other embodiments of this application.
Figure 31:
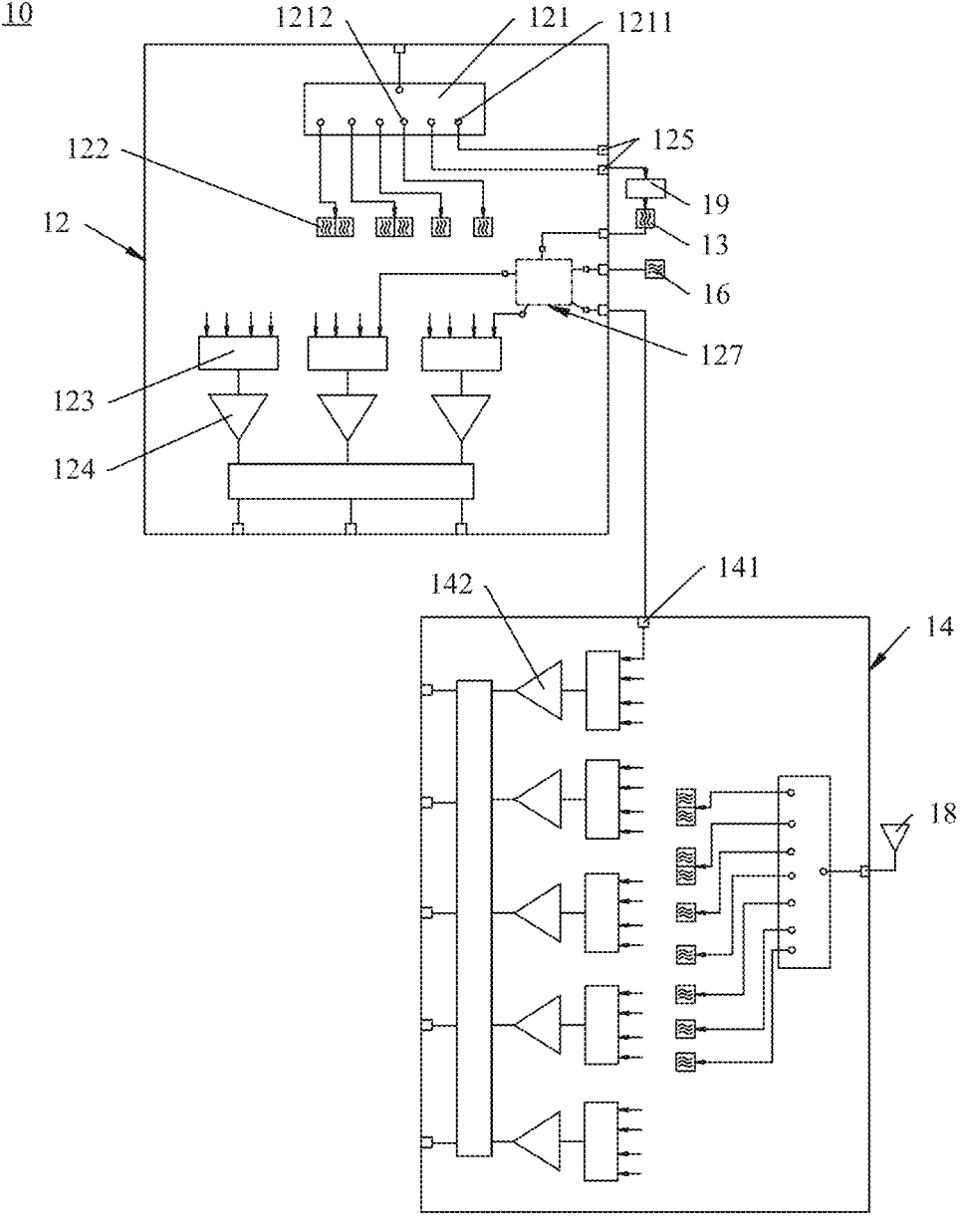
FIG. 31 is a schematic diagram of a radio frequency receiving system of a terminal device according to still other embodiments of this application.

Specifically, in some embodiments, refer to FIG. 30 and FIG. 31. FIG. 30 is a schematic diagram of a first radio frequency receiver 12 according to still embodiments of this application. FIG. 31 is a schematic diagram of a radio frequency receiving system 10 of a terminal device 100 according to still other embodiments of this application. The one fourth end portion 1271d is connected to one input end in the input end group of the plurality of second selector switches 123. It should be noted that, the fourth end portion 1271d and the first end portion 1271a are respectively connected to input ends of two second selector switches 123. In this way, in a case that the first radio frequency receiver 12 includes the third port 128 and the third end portion 1271c is connected to the third port 128, the third port 128 of the first radio frequency receiver 12 can be connected to an output end of one third filter 16, one second port 126 can be connected to an output end of the second filter 13, and an other second port 126 can be connected to the sixth port 141 of the second radio frequency receiver 14. In this way, the first radio frequency receiver 12 can be used in the terminal device 100 using both a MIMO technology and a CA technology, and first amplifiers 124 configured to transmit band signals gated by the second filter 13 and the third filter

16 can be flexibly selected, thereby enhancing applicability of the first radio frequency receiver 12.

Figure 32:
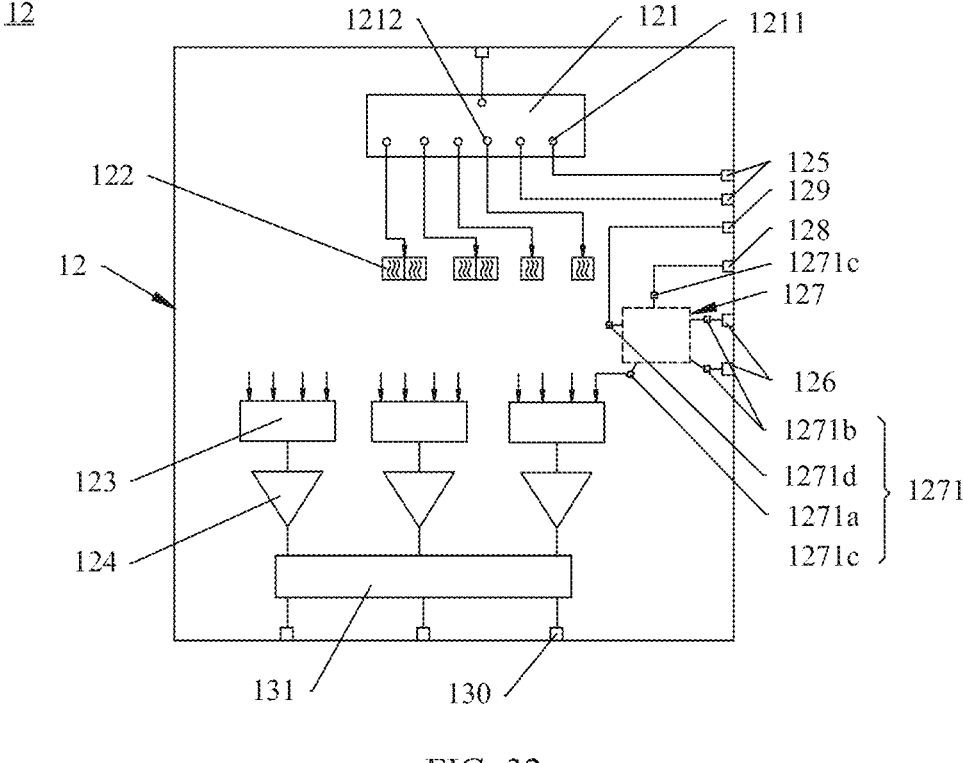
FIG. 32 is a schematic diagram of a first radio frequency receiver according to still other embodiments of this application.

In some other embodiments, refer to FIG. 32. FIG. 32 is a schematic diagram of a first radio frequency receiver 12 according to still other embodiments of this application. The radio frequency receiver 12 further includes one fourth port 129. The one fourth end portion 1271d is connected to the one fourth port 129. In this way, in a case that the first radio frequency receiver 12 includes the third port 128 and the third end portion 1271c is connected to the third port 128, the third port 128 of the first radio frequency receiver 12 can be connected to an output end of one third filter 16, the fourth port 129 can be connected to an output end of another third filter 16, one second port 126 can be connected to an output end of the second filter 13, and an other second port 126 can be connected to the sixth port 141 of the second radio frequency receiver 14. In this way, the first radio frequency receiver 12 can be used in the terminal device 100 using both a MIMO technology and a CA technology, and specifically, the switch assembly 127 can be selected to transmit band signals in CA combinations or MIMO band signals based on a communication system of an operator accessed by the terminal device 100, thereby enhancing applicability of the first radio frequency receiver 12.

Frequencies of signals transmitted from the output ends of the plurality of first amplifiers 124 to the processing circuit of the terminal device 100 are different. Therefore, to enable the processing circuit of the terminal device to receive the band signals from the plurality of first amplifiers 124 from an optimal receiving path, in some embodiments, still refer to FIG. 32. The radio frequency receiver 12 further includes a plurality of fifth ports 130 and one third selector switch 131. The one third selector switch 131 includes a plurality of input ends and a plurality of output ends, where the plurality of input ends of the one third selector switch 131 are respectively connected to output ends of the plurality of first amplifiers 124; the plurality of output ends of the one third selector switch 131 are respectively connected to the plurality of fifth ports 130; and the third selector switch 131 is configured to select the plurality of input ends of the one third selector switch 131 to be respectively connected to the plurality of output ends of the one third selector switch 131. In some examples, the input ends of the third selector switch 131 are connected to the output ends of the first amplifiers 124 in a one-to-one correspondence, the output ends of the third selector switch 131 are connected to the fifth ports 130 in a one-to-one correspondence, and one input end of the first selector switch 131 is simultaneously connected to only one output end. In this way, through the third selector switch 131, band signals output by the plurality of first amplifiers 124 can be transmitted to a corresponding port of a radio frequency transceiver chip in the processing circuit, to ensure a processing effect of the terminal device 100 on the received signals, thereby ensuring performance of the terminal device 100.

In the descriptions of this specification, the described specific features, structures, materials, or characteristics may be combined in a proper manner in any one or more of the embodiments or examples.

Finally, it should be noted that the foregoing embodiments are merely used for describing the technical solutions of the present invention, but are not intended to limit this application. It should be understood by a person of ordinary skill in the art that although this application has been described in detail with reference to the foregoing embodiments, modifications can be made to the technical solutions described in the foregoing embodiments, or equivalent replacements can be made to some technical features in the technical solutions, without departing from the spirit and scope of the technical solutions of embodiments of this application.

What is claimed is:

1. A radio frequency receiver, comprising:

at least one first port;

a first selector switch, comprising one input end and a plurality of output ends, wherein the first selector switch is configured to select to connect the one input end of the first selector switch and at least one of the plurality of output ends of the first selector switch, the one input end of the first selector switch is configured to connect a first antenna, the plurality of output ends of the first selector switch comprise at least one first output end and at least two second output ends, and the at least one first output end is respectively connected to the at least one first port;

a plurality of first filters, forming at least two filter groups, wherein each filter group comprises at least one first filter; and each first filter comprises an input end and an output end, and input ends of the at least two filter groups are respectively connected to the at least two second output ends;

a plurality of second selector switches, wherein each of the plurality of second selector switches comprises a plurality of input ends and one output end, and each of the plurality of second selector switches is configured to select to connect one of the plurality of input ends of a respective second selector switch and the one output end of the respective second selector switch; and all of the plurality of input ends of the plurality of second selector switches form an input end group, and a plurality of input ends in the input end group are respectively connected to output ends of the plurality of first filters;

a plurality of first amplifiers, wherein each of the plurality of first amplifiers comprises one input end and one output end, and the one input end of each of the plurality of first amplifiers is respectively connected to the one output end of each of the plurality of second selector switches;

two second ports; and a switch assembly, comprising at least three end portions, wherein the at least three end portions comprise one first end portion and two second end portions, and the one first end portion is connected to the one input end in the input end group formed by the plurality of second selector switches; the two second end portions are respectively connected to the two second ports; the switch assembly is capable of switching between a first state and a second state; when the switch assembly is in the first state, the two second end portions are connected, and the one first end portion is disconnected from any second end portion in the two second end portions;

and when the switch assembly is in the second state, the one first end portion is connected to one second end portion in the two second end portions, the one first end portion is disconnected from an other second end portion in the two second end portions, and the two second end portions are disconnected.

2. The radio frequency receiver according to claim 1, wherein the switch assembly is further capable of switching to a third state; and when the switch assembly is in the third state, the one first end portion is connected to the other second end portion in the two second end portions, the one first end portion is disconnected from the one second end portion in the two second end portions, and the two second end portions are disconnected.

3. The radio frequency receiver according to claim 2, wherein the switch assembly comprises a first connection structure, a second connection structure, and a third connection structure;

the first connection structure comprises a first connection line and a first switch; the second connection structure comprises a second connection line and a second switch; the third connection structure comprises a third connection line, and a third switch; one end of the first connection line, one end of the second connection line, and one end of the third connection line are connected, an other end of the first connection line is connected to the one first end portion, and an other end of the second connection line and an other end of the third connection line are respectively connected to the two second end portions; and the first switch is connected in series in the first connection line, the second switch is connected in series in the second connection line, and the third switch is connected in series in the third connection line.

4. The radio frequency receiver according to claim 2, wherein the switch assembly comprises a first connection structure, a second connection structure, and a third connection structure;

the first connection structure comprises a first connection line and a first switch, the first connection line is connected between the two second end portions, and the first switch is connected in series in the first connection line;

the second connection structure comprises a second connection line and a second switch, the second connection line is connected between the one first end portion and the one second end portion in the two second end portions, and the second switch is connected in series in the second connection line; and the third connection structure comprises a third connection line and a third switch, the third connection line is connected between the one first end portion and the other second end portion in the two second end portions, and the third switch is connected in series in the third connection line.

5. The radio frequency receiver according to claim 3, wherein the at least three end portions further comprise one third end portion;

the switch assembly further comprises a fourth connection structure, a fifth connection structure, and a sixth connection structure;

the fourth connection structure comprises a fourth connection line and a fourth switch, the fourth connection line is connected between the one third end portion and the one first end portion, and the fourth switch is connected in series in the fourth connection line;

the fifth connection structure comprises a fifth connection line and a fifth switch, the fifth connection line is connected between the one third end portion and the one second end portion in the two second end portions, and the fifth switch is connected in series in the fifth connection line; and the sixth connection structure comprises a sixth connection line and a sixth switch, the sixth connection line is connected between the one third end portion and the other second end portion in the two second end portions, and the sixth switch is connected in series in the sixth connection line.

6. The radio frequency receiver according to claim 4, wherein the at least three end portions further comprise one third end portion;

the switch assembly further comprises a fourth connection structure;

the fourth connection structure comprises a fourth connection line and a fourth switch;

one end of the fourth connection line is connected to one end of the first connection line, to one end of the second connection line, and to one end of the third connection line, and an other end of the fourth connection line is connected to the one third end portion; and the fourth switch is connected in series in the fourth connection line.

7. The radio frequency receiver according to claim 5, wherein the radio frequency receiver further comprises one third port; and the one third end portion is connected to the one third port.

8. The radio frequency receiver according to claim 5, wherein the one third end portion is connected to the one input end in the input end group.

9. The radio frequency receiver according to claim 5, wherein the at least three end portions further comprise one fourth end portion;

the switch assembly further comprises a seventh connection structure, an eighth connection structure, a ninth connection structure, and a tenth connection structure;

the seventh connection structure comprises a seventh connection line and a seventh switch, the seventh connection line is connected between the one fourth end portion and the one first end portion, and the seventh switch is connected in series in the seventh connection line;

the eighth connection structure comprises an eighth connection line and an eighth switch, the eighth connection line is connected between the one fourth end portion and the one second end portion in the two second end portions, and the eighth switch is connected in series in the eighth connection line;

the ninth connection structure comprises a ninth connection line and a ninth switch, the ninth connection line is connected between the one fourth end portion and the other second end portion in the two second end portions, and the ninth switch is connected in series in the ninth connection line; and the tenth connection structure comprises a tenth connection line and a tenth switch, the tenth connection line is connected between the one fourth end portion and the one third end portion, and the tenth switch is connected in series in the tenth connection line.

10. The radio frequency receiver according to claim 6, wherein the at least three end portions further comprise one fourth end portion;

the switch assembly further comprises a fifth connection structure;

the fifth connection structure comprises a fifth connection line and a fifth switch; one end of the fifth connection line is connected to the one end of the first connection line, the one end of the second connection line, the one end of the third connection line, and the one end of the fourth connection line, and an other end of the fifth connection line is connected to the one fourth end portion; and the fifth switch is connected in series in the fifth connection line.

11. The radio frequency receiver according to claim 9, wherein the one fourth end portion is connected to the one input end in the input end group.

12. The radio frequency receiver according to claim 9, wherein the radio frequency receiver further comprises one fourth port; and the one fourth end portion is connected to the one fourth port.

13. The radio frequency receiver according to claim 1, wherein the radio frequency receiver further comprises:

a plurality of fifth ports; and one third selector switch, comprising a plurality of input ends and a plurality of output ends, wherein the plurality of input ends of the one third selector switch are respectively connected to output ends of the plurality of first amplifiers; the plurality of output ends of the one third selector switch are respectively connected to the plurality of fifth ports; and the one third selector switch is configured to select the plurality of input ends of the one third selector switch to be respectively connected to the plurality of output ends of the one third selector switch.

14. The radio frequency receiver according to claim 4, wherein the at least three end portions further comprise one third end portion;

the switch assembly further comprises a fourth connection structure, a fifth connection structure, and a sixth connection structure;

the fourth connection structure comprises a fourth connection line and a fourth switch, the fourth connection line is connected between the one third end portion and the one first end portion, and the fourth switch is connected in series in the fourth connection line;

the fifth connection structure comprises a fifth connection line and a fifth switch, the fifth connection line is connected between the one third end portion and the one second end portion in the two second end portions, and the fifth switch is connected in series in the fifth connection line; and the sixth connection structure comprises a sixth connection line and a sixth switch, the sixth connection line is connected between the one third end portion and the other second end portion in the two second end portions, and the sixth switch is connected in series in the sixth connection line.

15. The radio frequency receiver according to claim 2, wherein the radio frequency receiver further comprises:

a plurality of fifth ports; and one third selector switch, comprising a plurality of input ends and a plurality of output ends, wherein the plurality of input ends of the one third selector switch are respectively connected to output ends of the plurality of first amplifiers; the plurality of output ends of the one third selector switch are respectively connected to the plurality of fifth ports; and the one third selector switch is configured to select the plurality of input ends of the one third selector switch to be respectively connected to the plurality of output ends of the one third selector switch.

16. The radio frequency receiver according to claim 3, wherein the radio frequency receiver further comprises:

a plurality of fifth ports; and one third selector switch, comprising a plurality of input ends and a plurality of output ends, wherein the plurality of input ends of the one third selector switch are respectively connected to output ends of the plurality of first amplifiers; the plurality of output ends of the one third selector switch are respectively connected to the plurality of fifth ports; and the one third selector switch is configured to select the plurality of input ends of the one third selector switch to be respectively connected to the plurality of output ends of the one third selector switch.

17. A radio frequency receiving system, comprising:
a first antenna; and
a first radio frequency receiver, comprising:
at least one first port;
a first selector switch, comprising one input end and a plurality of output ends, wherein the first selector switch is configured to select to connect the one input end of the first selector switch and at least one of the plurality of output ends of the first selector switch, the one input end of the first selector switch is configured to connect to the first antenna, the plurality of output ends of the first selector switch comprise at least one first output end and at least two second output ends, and the at least one first output end is respectively connected to the at least one first port;
a plurality of first filters, forming at least two filter groups, wherein each filter group comprises at least one first filter; and each of the plurality of first filters comprises an input end and an output end, and input ends of the at least two filter groups are respectively connected to the at least two second output ends;
a plurality of second selector switches, wherein each of the plurality of second selector switches comprises a plurality of input ends and one output end, and each of the plurality of second selector switches is configured to select to connect one of the plurality of input ends of a respective second selector switch and the one output end of the respective second selector switch; and all of the plurality of input ends of the plurality of second selector switches form an input end group, and a plurality of input ends in the input end group are respectively connected to output ends of the plurality of first filters;
a plurality of first amplifiers, wherein each of the plurality of first amplifiers comprises one input end and one output end, and the one input end of each of the plurality of first amplifiers is respectively connected to the one output end of each of the plurality of second selector switches;
two second ports; and
a switch assembly, comprising at least three end portions, wherein the at least three end portions comprise one first end portion and two second end portions, and the one first end portion is connected to one input end in the input end group formed by the plurality of second selector switches; the two second end portions are respectively connected to the two second ports; the switch assembly is capable of switching between a first state and a second state; when the switch assembly is in the first state, the two second end portions are connected, and the one first end portion is disconnected from any second end portion in the two second end portions; and when the switch assembly is in the second state, the one first end portion is connected to one second end portion in the two second end portions, the one first end portion is disconnected from an other second end portion in the two second end portions, and the two second end portions are disconnected.

18. The radio frequency receiving system according to claim 17, wherein the radio frequency receiving system further comprises:
a second filter, comprising an input end and an output end, wherein the input end of the second filter is connected to one first port in the at least one first port in the first radio frequency receiver, and the output end of the second filter is connected to one of the two second ports in the first radio frequency receiver; and
a second radio frequency receiver, comprising a sixth port and a second amplifier, wherein the second amplifier comprises an input end, the input end of the second amplifier is connected to the sixth port, and the sixth port is connected to an other of the two second ports in the first radio frequency receiver.

19. An electronic device, comprising:
a radio frequency receiving system, comprising:
a first antenna; and
a first radio frequency receiver, comprising:
at least one first port;
a first selector switch, comprising one input end and a plurality of output ends, wherein the first selector switch is configured to select to connect the one input end of the first selector switch and at least one of the plurality of output ends of the first selector switch, the one input end of the first selector switch is configured to connect to the first antenna, the plurality of output ends of the first selector switch comprise at least one first output end and at least two second output ends, and the at least one first output end is respectively connected to the at least one first port;
a plurality of first filters, forming at least two filter groups, wherein each filter group comprises at least one first filter; and each of the plurality of first filters comprises an input end and an output end, and input ends of the at least two filter groups are respectively connected to the at least two second output ends;
a plurality of second selector switches, wherein each of the plurality of second selector switches comprises a plurality of input ends and one output end, and each of the plurality of second selector switches is configured to select to connect one of the plurality of input ends of a respective second selector switch and the one output end of the respective second selector switch; and all of the plurality of input ends of the plurality of second selector switches form an input end group, and a plurality of input ends in the input end group are respectively connected to output ends of the plurality of first filters;
a plurality of first amplifiers, wherein each of the plurality of first amplifiers comprises one input end and one output end, and the one input end of each the plurality of first amplifiers is respectively connected to the one output end of each of the plurality of second selector switches;
two second ports; and
a switch assembly, comprising at least three end portions, wherein the at least three end portions comprise one first end portion and two second end portions, and the one first end portion is connected to one input end in the input end group formed from the plurality of second selector switches; the two second end portions are respectively connected to the two second ports; the switch assembly is capable of switching between a first state and a second state; when the switch assembly is in the first state, the two second end portions are connected, and the one first end portion is disconnected from any second end portion in the two second end portions; and when the switch assembly is in the second state, the one first end portion is connected to one second end portion in the two second end portions, the one first end portion is disconnected from an other second end portion in the two second end portions, and the two second end portions are disconnected.

20. The electronic device according to claim 19, wherein the radio frequency receiving system further comprises:

a second filter, comprising an input end and an output end, wherein the input end of the second filter is connected to one first port in the at least one first port in the first radio frequency receiver, and the output end of the second filter is connected to one of the two second ports in the first radio frequency receiver; and a second radio frequency receiver, comprising a sixth port and a second amplifier, wherein the second amplifier comprises an input end, the input end of the second amplifier is connected to the sixth port, and the sixth port is connected to an other of the two second ports in the first radio frequency receiver.

* * * * *